United States Patent [19]

Takaoka et al.

[11] Patent Number: 5,670,247
[45] Date of Patent: Sep. 23, 1997

[54] PHOTOREACTIVE NOXIOUS SUBSTANCE PURGING AGENT AND PHOTOREACTIVE NOXIOUS SUBSTANCE PURGING MATERIAL USING THE AGENT

[75] Inventors: Kazuchiyo Takaoka; Kenji Hyodo; Isao Ebihara; Yasuyuki Oku; Katsushi Ohgami, all of Tokyo, Japan

[73] Assignee: Mitsubishi Paper Mills Limited, Tokyo, Japan

[21] Appl. No.: 535,917

[22] Filed: Sep. 28, 1995

[30] Foreign Application Priority Data

| Oct. 3, 1994 | [JP] | Japan | 6-238866 |
| Oct. 13, 1994 | [JP] | Japan | 6-247990 |
| Dec. 5, 1994 | [JP] | Japan | 6-300961 |
| Jan. 23, 1995 | [JP] | Japan | 7-008425 |

[51] Int. Cl.$^6$ .................................................. B32B 5/16
[52] U.S. Cl. .......................... 428/297; 428/303; 428/326; 428/328; 428/329; 428/331; 428/339; 428/340; 428/341; 428/342; 428/452
[58] Field of Search .................. 428/323, 328, 428/329, 331, 297, 303, 332, 326, 339, 340, 341, 342, 452, 533, 537.5, 903; 4/347

[56] References Cited

U.S. PATENT DOCUMENTS

| 3,382,305 | 5/1968 | Breen | 264/171 |
| 4,761,203 | 8/1988 | Vinson | 162/9 |
| 4,892,712 | 1/1990 | Robertson et al. | 422/186 |
| 4,954,465 | 9/1990 | Kawashima et al. | 502/5 |
| 4,966,759 | 10/1990 | Robertson et al. | 422/186 |
| 5,032,241 | 7/1991 | Robertson et al. | 204/157.15 |
| 5,100,659 | 3/1992 | Kurihara et al. | 424/76.1 |
| 5,501,801 | 3/1996 | Zhang et al. | 210/748 |

FOREIGN PATENT DOCUMENTS

| 0 614 682 | 9/1994 | European Pat. Off. . |
| 63-156541 | 6/1988 | Japan . |
| 2-253848 | 10/1990 | Japan . |
| 4-82558 | 3/1992 | Japan . |
| 4-185722 | 7/1992 | Japan . |
| 5-237963 | 9/1993 | Japan . |
| 86/03414 | 6/1986 | WIPO . |

OTHER PUBLICATIONS

R. Cundall et al., "The Photocatalytic Oxidation of Liquid Phase Propan–2–ol by Pure Rutile and Titanium Dioxide Pigments", *J. Oil Col. Chem. Assoc.* 61: 351–355 (1978).

*Primary Examiner*—H. Thi Le
*Attorney, Agent, or Firm*—Foley & Lardner

[57] ABSTRACT

Disclosed is a photoreactive noxious substance purging agent comprising a photoreactive semiconductor, a carrier, and a microfibrillated microfiber. In this photoreactive noxious substance purging agent, loss of the photoreaction effective surface of the photoreactive semiconductor can be held down to the minimum and a sufficient noxious substance removing characteristics can be exhibited.

19 Claims, 2 Drawing Sheets

PHOTOREACTIVE NOXIOUS SUBSTANCE PURGING AGENT AND PHOTOREACTIVE NOXIOUS SUBSTANCE PURGING MATERIAL USING THE AGENT

BACKGROUND OF THE INVENTION

The present invention relates to a photoreactive noxious substance purging agent capable of decomposing noxious substances in air and water such as malodor or bacteria utilizing a photocatalytic decomposition action of photoreactive semiconductors and to a photoreactive noxious substance purging material using the said removing agent.

Recently, with growing of interest in environmental problems, demands for removing bad smell in everyday life and removing noxious substances contained in water such as industrial waste water in a low concentration have increased. Hitherto, removal of such low concentration noxious substances has been carried out using composite inorganic adsorbents such as active carbon, active silica, active alumina and metal oxides. These adsorbents are used as powder or in the form of a sheet as proposed in Japanese Utility Model Kokai No. 59-119324.

However, when these adsorbents are used for removal of noxious substances, the adsorptivity gradually decreases according as they adsorb the noxious substances, and regeneration of the adsorbents requires high-temperature treatments. Therefore, when practical adsorptivity has been lost, the adsorbents must be changed, and, for this reason, the period for which the adsorbents can act effectively must be ascertained. Thus, there are various problems in use of these adsorbents.

Recently, removal of noxious substances using photoreactive semiconductors has been noticed. For example, Cundall et al report in J. Oil. Chem. Assoc., 61, 351 (1978) that when ultraviolet light is irradiated using titanium oxide, alcohol in the mixed system of water and alcohol is decomposed. Furthermore, Japanese Patent Kokai No. 61-135669 discloses a process of decomposing sulfur compounds which are malodorous substances by irradiating titanium oxide or zinc oxide with ultraviolet light.

Moreover, Japanese Patent Kokoku No. 2-62297 discloses a process of removing low concentration nitrogen oxides using a mixture of titanium oxide and active carbon. The decomposition of malodorous substances with photoreactive semiconductors such as titanium oxide and zinc oxide is based on photocatalytic oxidizing action of the photoreactive semiconductors on the malodorous substances contacting with the semiconductors due to excitation with activation rays. Therefore, the photoconductive semiconductors are not consumed or deteriorated owing to the decomposition of the malodorous substances. Accordingly, the ability of them does not substantially lower as far as they are exposed to light, and they have greater advantages than the above-mentioned adsorbents.

Since the decomposition ability of these photoreactive semiconductors increases with increase in the chance of contact with the malodorous substances in view of the above-mentioned decomposition mechanism, the most effective form of use is powder by which the greatest contact area with a gas can be obtained. However, in the case of removing noxious substances in gas phase, powder is practically difficult to handle. In general, photoreactive semiconductors having photocatalytic ability have a particle size of 0.3 µm or less, and when they are merely wrapped with a paper or nonwoven fabric, the particles fall off therefrom. When these fine particles are handled as a powder, they strongly adhere to the skin of hands, etc. and can be removed with difficulty or they fly up in air. Especially when they are incorporated into a deodorizing device together with a light irradiating device, they must be subjected to some processings to improve the handleability.

As an example of improving the handleability of photoreactive semiconductors, Japanese Patent Kokai No. 1-234729 discloses an air-conditioner in which is incorporated a photoreactive semiconductor layer composite comprising a titanium oxide (a photoreactive semiconductor)-supporting honeycomb active carbon. In this conditioner, a special honeycomb active carbon is necessary for supporting titanium oxide and increasing the photoreaction efficiency. Moreover, a special step is needed to hold titanium oxide on and in the honeycom and a spongy buffer must be used for preventing titanium oxide from falling off.

Japanese Patent Kokai No. 3-233100 discloses a ventilation equipment for driveway tunnels which comprises an electrostatic precipitator for removing particles of soot in contaminated air and a noxious gas remover for removing noxious gases in contaminated air. The noxious gas remover comprises a mixture of titanium oxide and active carbon and a light source for irradiating the mixture with a light of 300 nm or longer in wavelength. Since the titanium oxide is fixed by an adhesive, there is the problem that the exposed surface of titanium oxide which directly contacts with noxious gases reduces. Furthermore, since the titanium oxide is allowed to adhere to a glass tube, it cannot be freely after-processed, and handling is restricted.

Japanese Patent Kokai No. 3-75062 discloses a process for making a photoreactive semiconductor-supporting sheet which comprises supporting the photoreactive semiconductor on a specific latex. There is also the problem that the photoreactive semiconductor is buried in the latex film, and the effective surface area of the photoreactive semiconductor decreases. Furthermore, Japanese Patent Kokai No. 4-256755 discloses a method of supporting a photoreactive semiconductor on a particulate pulp having uneven surface and having a particle size of about 1 to 30 mm. In order to prevent the photoreactive semiconductor from falling off from the particulate pulp, a metal alkoxide and a latex are used in combination, and the effective surface area of the photoreactive semiconductor also decreases.

For firmly supporting a photoreactive semiconductor, Japanese Patent Kokai No. 3-94814 discloses a method of deodorization using a corrugated sheet prepared by impregnating a corrugated ceramic paper with a titania sol and, then, firing the paper to support titanium oxide on the paper. Japanese Patent Kokai No. 5-253544 also discloses a method of supporting on an inorganic carrier by sintering. These methods can firmly support the photoreactive semiconductors on carriers, but there are still problems that titanium oxide sometimes granulates depending on the firing time to decrease the effective surface area and that photoreactive semiconductors buried in inorganic carriers such as ceramic paper cannot effectively act and, besides, the photoreactive semiconductors cannot be sufficiently supported in such an amount as they can act effectively.

The usefulness of photoreactive semiconductors includes not only the above-mentioned removal of noxious gases, but also photobactericidal action. This is discussed in Collection of Chemical Engineering Articles, Vol. 19, No. 6, Page 1149, edited by Chemical Engineering Association. In the article, titanium oxide is used in the form of suspension as in the case of Cundall et al. Killing of bacteria by photobactericidal action of photoreactive semiconductors is applicable not only to purification of, for example, bath and swimming pool, but also to sterilization of drinking water. Considering that removal of organic matters in water can be utilized for treatment of industrial waste liquors, photoreactive semiconductors can be considered to have a considerably wide field of application, but when they are used in the form of a suspension, there is a serious problem that the treated waste liquor and the photoreactive semiconductor must be separated.

SUMMARY OF THE INVENTION

The present invention relates to a photoreactive noxious substance purging agent capable of decomposing noxious substances in air and water such as malodor or bacteria utilizing a photocatalytic decomposition action of photoreactive semiconductors and to a photoreactive noxious substance purging material using the said removing agent, and the object of the present invention is to provide a photoreactive noxious substance purging agent in which loss of effective surface area of photoreactive semiconductor can be held down to the minimum and noxious substance removing ability can be effectively brought out and which can satisfactorily hold a powder of photoreactive semiconductor or the like and can be handled without causing liberation of the photoreactive semiconductor even in water, and to further provide a photoreactive noxious substance purging material using said removing agent. Furthermore, the present invention provides a photoreactive noxious substance purging material comprising a base to which various properties such as flame retardancy, strength and hand are given so that it can be handled in various forms by improving handleability and post-processability of the photoreactive noxious substance purging agent.

The inventors have conducted intensive research in an attempt to solve the above problems and have found that loss of the effective surface area for photoreaction of the photoreactive semiconductor can be held down to the minimum and the noxious substance removing ability can be effectively brought out when the photoreactive noxious substance purging agent is composed of a photoreactive semiconductor, a carrier and a microfibrillated microfiber.

When this photoreactive noxious substance purging agent is enclosed between sheets, at least one of which is gas permeable, there can be obtained a photoreactive noxious substance purging material having excellent strength in which the photoreactive noxious substance purging agent can be not only spread and held in a large area, but also processed into optional shapes, and, furthermore, the photoreactive noxious substance purging agent is not liberated even if it is used in water. Moreover, when a flame-retardant nonwoven fabric is used as the gas-permeable sheet, flame retardance of the whole removing material can be attained since the photoreactive semiconductor and the carrier which are main components of the removing material are per se incombustible, and, in addition, flexibility and hand of the photoreactive noxious substance purging material can be adjusted.

On the other hand, when the photoreactive semiconductor, the carrier and the microfibrillated microfiber are enclosed between two or more sheets, at least one of which has gas permeability and, in some case, has flame retardancy, if a thermoplastic resin is used together with these enclosures such as the photoreactive semiconductor, the thermoplastic resin acts as a binder to improve adhesion between the sheets, and there can be obtained a photoreactive noxious substance purging material having excellent strength in which the photoreactive noxious substance purging agent is not liberated even if the material is used in water.

Furthermore, as for the form of the photoreactive noxious substance purging material containing the photoreactive noxious substance purging agent comprising the photoreactive semiconductor, the carrier and the microfibrillated microfiber in the present invention, in addition to the above-mentioned type of the photoreactive noxious substance purging agent being enclosed between the sheets, there may be employed a photoreactive noxious substance purging agent-coated (laminate) type formed by coating an aqueous liquid of a composite flocculate comprising at least a photoreactive semiconductor, a carrier and a microfibrillated microfiber on a support comprising at least a thermoplastic resin.

Furthermore, there may be formed a photoreactive noxious substance purging material in the form of a sheet of the photoreactive noxious substance purging agent (self-contained type) prepared by mixing the aqueous liquid of a composite flocculate comprising at least a photoreactive semiconductor, a carrier and a microfibrillated microfiber with a dispersion of a fibrous thermoplastic resin which substantially constitutes the support and subjecting the mixture to wet paper making process to form a sheet. Moreover, the aqueous liquid of composite flocculate is mixed with an aqueous dispersion containing at least one of inorganic fiber and aramid fiber, the mixture is subjected to wet paper making process to form a wet paper, two or more of the resulting wet papers are laminated, heated and pressed to integrate them, and, thus, the photoreactive noxious substance purging material in the form of a board can be obtained.

DETAILED DESCRIPTION OF THE INVENTION

Figure 1:
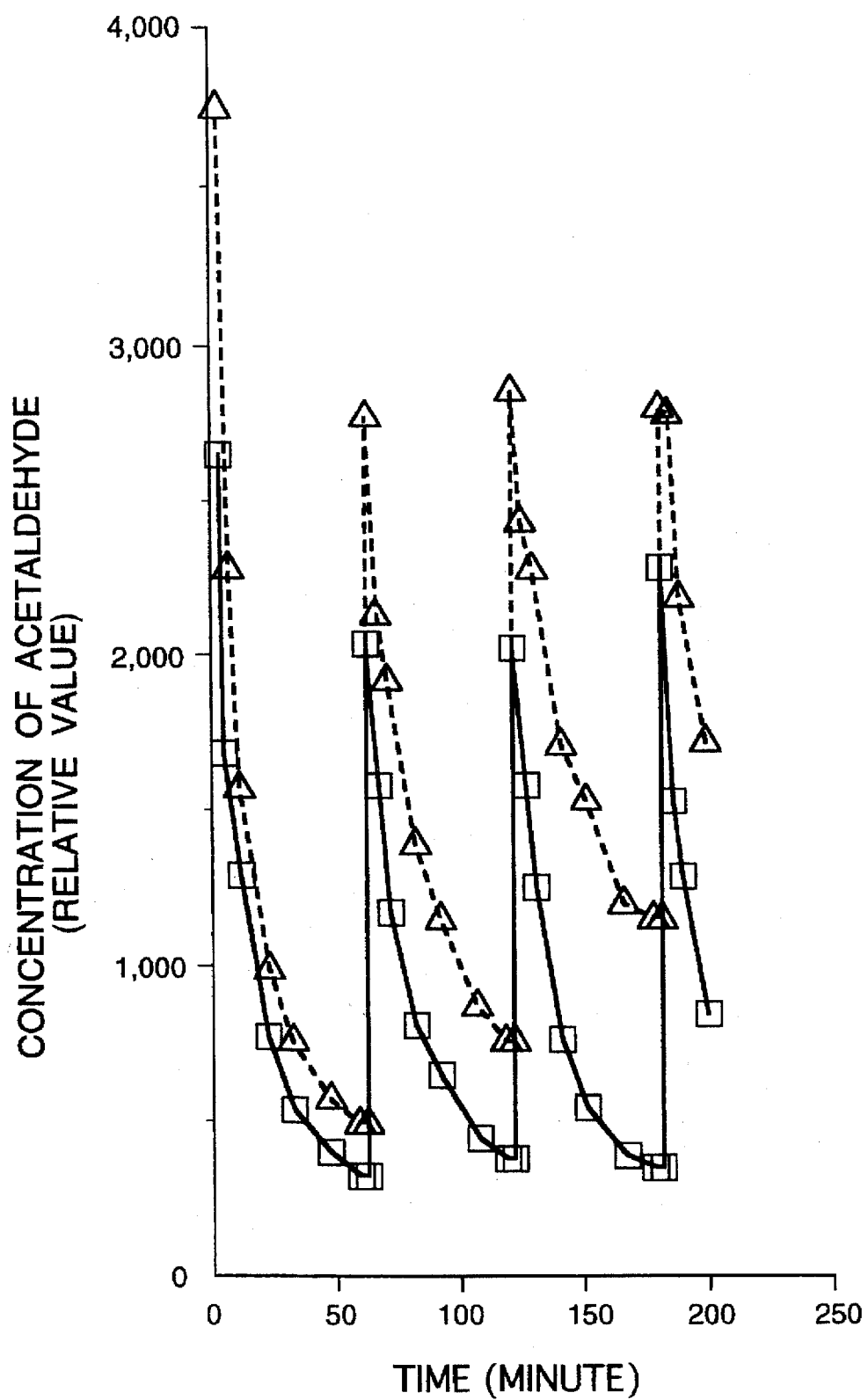
FIG. 1 is a graph which shows decrease in the concentration of acetaldehyde when the photoreactive noxious substance purging agent of the present invention was used.

The photoreactive noxious substance purging agent of the present invention, and constructive elements of the photoreactive noxious substance purging material comprising said removing agent, and a method for producing the same will be explained in detail below. The photoreactive semiconductors used in the present invention are semiconductors which induce a photocatalytic reaction and have a width of forbidden band of 0.5–5 eV, preferably 1–4 eV. As examples of these photoreactive semiconductors used in the present invention, mention may be made of particles of metal oxides such as zinc oxide, tungsten oxide, titanium oxide, cerium oxide, etc. Among them, titanium oxide is most suitable for use in life space from the points of structural stability, photoreactive noxious substance removing ability and safety in handling, and can be advantageously used as the photoreactive semiconductors in the present invention.

The titanium oxides advantageously usable as the photoreactive semiconductors include, in addition to general-purpose titanium dioxide used as white pigments, titanium oxides and hydroxides such as metatitanic acid, orthotitanic acid, hydrous titanium oxide, hydrated titanium oxide and titanium hydroxide. These titanium oxides may be surface-treated with metals such as Pt, Au, Ag, Cu, Pd, Ni, Rh, Nb, Sn and Ru, and metal oxides such as ruthenium oxide and nickel oxide.

The noxious substance decomposing mechanism of the photoreactive semiconductor is as follows: When the photoreactive semiconductor receives an active light, free radicals are formed on the surface and they attack the noxious substance which contacts with the photoreactive semiconductor to decompose the noxious substance. In order to sufficiently exhibit this process, it is effective to increase the specific surface area of the photoreactive semiconductor, thereby to increase the free radical-producing points. In addition, when the specific surface area is increased, contact area with the noxious substance per unit amount also increases, and, hence, the larger specific surface area is effective to decompose the noxious substance.

However, when it is attempted to increase the specific surface area of the photoreactive semiconductor, stability in the production of photoreactive semiconductor decreases and it becomes difficult to obtain reproducible properties. Thus, the specific surface area of the photoreactive semiconductor of the present invention is preferably about 10–500 $m^2/g$, more preferably about 100–500 $m^2/g$. Especially, in the case of titanium oxide, the specific surface area is preferably about 50–400 $m^2/g$, more preferably about 100–400 $m^2/g$. Furthermore, the particle size of the photoreactive semiconductor is preferably about 3–120 nm, more preferably about 3–20 nm.

Content of the photoreactive semiconductor in the photoreactive noxious substance purging material is preferably 1–50 $g/m^2$, more preferably 2–30 $g/m^2$. If the content is lower than 1 $g/m^2$, the effect of decomposing the noxious substance cannot substantially be expected and if it is higher than 50 $g/m^2$, the photoreactive semiconductor cannot be firmly held in the matrix of the photoreactive noxious substance purging material to cause leakage of the photoreactive semiconductor. Since with increase in the absolute amount of the photoreactive semiconductor, the higher effect of decomposing the noxious substance can be expected, and, therefore, it is desired to increase the content of the photoreactive semiconductor within the range where handleability and other characteristics are satisfied.

Since the photoreactive semiconductors having a large specific surface area which are used preferably in the present invention are very small in particle size as mentioned above, and are poor in film-formability when used singly, the photoreactive semiconductors held in the matrix of photoreactive noxious substance purging material fall off shortly and cannot be used stably at least in water. Therefore, a carrier is used in combination with the photoreactive semiconductor to form larger particles, whereby leakage of the photoreactive semiconductor at the time of preparation and use can be prevented and deactivation of active points on the surface of the photoreactive semiconductor can be considerably inhibited as compared with the flocculate of single photoreactive semiconductor.

Examples of the carrier used in the present invention are silica, alumina, zirconia, activated clay, zeolite, sepiolite, halloysite, hydroapatite, zinc oxide, silica-alumina composites, silica-zinc oxide composites, silica-magnesia composites, zinc oxide-magnesia composites, silica-alumina-zinc oxide composites, silica-alumina-magnesia composites, and active carbons prepared from various materials such as wood chips and coconut shell.

When the carriers per se have adsorptivity, such as activated clay, zeolite, sepiolite and active carbons, the photoreactive semiconductors are not needed to be supported on all of the carriers, and those which have the photoreactive semiconductors supported and those which have no semiconductors supported may be used together or separately. In the case of ferrous metal compounds which per se have catalytic action, such as iron sesquioxide, the photoreactive semiconductors may be supported thereon or they may be mixed with carrier particles having the photoreactive semiconductors supported thereon. Moreover, some carriers preferentially adsorb those substances having specific chemical or physical characteristics such as acidic substances and basic substances. Therefore, it is preferred to select optimum species from a group of carriers depending on conditions of use, and, in some cases, they may be used in combination.

The carriers used in the present invention have a specific surface area of preferably about 50–2000 $m^2/g$, and in the case of active carbon, the specific surface area is preferably 500–1500 $m^2/g$. The particle size of the carriers is preferably at least about 10 times that of the photoreactive semiconductors used together. The particle size of the carriers is preferably 100 nm–50 μm, and in the case of active carbon, it is 50 nm–10 μm. The carriers may be used in the form of particles, but especially, in the case of enclosing them between gas-permeable sheets, they may be in the form of pellets or tablets prepared by molding the particles.

Content of the carrier in the photoreactive noxious substance purging material of the present invention is determined by mixing ratio of the photoreactive semiconductor and the carrier. That is, the mixing weight ratio of the photoreactive semiconductor and the carrier is preferably about 1:30–10:1, more preferably about 1:10–5:1. With the absolute amount of the photoreactive semiconductor being fixed, if the mixing ratio of the carrier to the photoreactive semiconductor is too high, content of the carrier in the photoreactive noxious substance purging material is high and it is difficult to hold the carrier in the matrix of the photoreactive noxious substance purging material. On the other hand, if the mixing ratio is too low, the photoreactive semiconductor agglomerates, resulting in deterioration of noxious substance removing ability and, besides, causing falling off of powder with lapse of time.

In the present invention, if necessary, a microfibrillated microfiber is used together with the photoreactive semiconductor and the carrier. The microfibrillated microfiber used in the present invention can be obtained by various processes such as those enumerated below.

(1) A process of dropping a synthetic polymer liquid into a solvent which is a poor solvent for the polymer under application of shearing force to precipitate a fibrous fibril (Fibrid process, Japanese Patent Kokoku No. 35-11851).

(2) A process of polymerizing a synthetic monomer under application of shearing to precipitate a fibril (Polymerization shearing process, Japanese Patent Kokoku No. 47-21898).

(3) A process of mixing two or more incompatible polymers, melt-extruding or spinning the mixture, followed by cutting and fibrillating into fibers by a mechanical means (Split process, Japanese Patent Kokoku No. 35-9651).

(4) A process of blending two or more incompatible polymers, melt-extruding or spinning the blend, followed by cutting, immersing in a solvent to dissolve one of the polymers and fibrillating into fibers (Polymer blend dissolving process, U.S. Pat. No. 3,382,305).

(5) A process of explosively jetting a synthetic polymer from high-pressure side into low-pressure side at a temperature higher than the boiling point of solvent and then, fibrillating into fibers (Flush spinning process, Japanese Patent Kokoku No. 36-16460).

(6) A process of blending a polyester polymer with an alkali-soluble component incompatible with the polymer, molding the blend, and then subjecting the molded product to a weight reduction processing with an alkali, followed by beating and fibrillating into fibers (Alkali weight reduction and beating process, Japanese patent Kokai No. 56-315).

(7) A process of cutting a highly crystalline and highly orientated fiber such as cellulose fiber or Kevlar fiber into a suitable fiber length, dispersing the fibers in water, and fibrillating them by a homogenizer, beating machine, sand mill, etc. (Japanese Patent Kokai Nos. 56-100801 and 59-92011 and U.S. Pat. No. 4,761,203).

Examples of the microfibrillated microfibers used in the present invention are cellulose fibers fibrillated by a homogenizer (CELLISH KY-100S and CELLISH KY-110S), similarly fibrillated aramid fibers (CELLISH KY-400S), similarly fibrillated acrylic fibers (CELLISH KY-410S), similarly fibrillated polyethylene fibers (CELLISH KY-420S), similarly fibrillated polypropylene fibers (CELLISH KY-430S) (these are manufactured by Daicel Ltd.), fibril fibers comprising an acrylonitrile homopolymer (CASHMILON FCA manufactured by Asahi Kasei Kogyo K.K.) beaten by a refiner, etc., and polyester pulps obtained by the alkali weight reduction beating process.

Bacteria cellulose defibrated products may also be used as the microfibrillated microfibers. The bacteria cellulose defibrated products include those which are obtained by mechanically splitting celluloses produced by microorganisms, those containing hetero polysaccharides having a main chain of cellulose, and those containing glucans such as β-1,3 and β-1,2. These are described in detail in Japanese Patent Kokoku No. 6-72394, etc.

The diameter of the microfibrillated microfibers can be adjusted from the order of submicron to the order of micron or more depending on the fibrillation conditions including shearing, beating, splitting, etc. when the microfiber is incorporated in the course of supporting the photoreactive semiconductor on the carrier having a particle diameter equal to or larger than that of the microfiber, in order to form large and stable flocks by strong interaction, the preferred microfiber is at least partially, more preferably wholly fibrillated to 1 μm or less.

As mentioned above, the microfibrillated microfibers used in the present invention have very fine diameter as compared with usual fibers. Therefore, they have a high specific surface area and there are much more polar functional groups resulting from the fibers, and, as a result, the adsorptivity is markedly increased. Accordingly, such microfibrillated microfibers have the effect of firmly binding the photoreactive semiconductor and the carrier or the photoreactive semiconductors with each other or the carriers with each other without greatly covering the surface of the particles by fibrillation and with use of them in a small amount. Furthermore, once they interact with the particles, the interaction does not substantially decrease even when introduced into water.

Content of the microfibrillated microfiber used in the present invention is determined by the mixing ratio of the photoreactive semiconductor and the carrier and the microfibrillated microfiber. That is, the amount of the microfibrillated microfiber based on the total amount of the photoreactive semiconductor and the carrier is preferably about 0.2–50% by weight, more preferably 0.5–10% by weight. Although the microfibrillated microfiber has the effect to hold the photoreactive semiconductor in the matrix of the removing material, when the microfiber directly contacts with the photoreactive semiconductor, it undergoes deterioration due to decomposition. Therefore, it is preferred to use the microfiber in the minimum amount in which the photoreactive semiconductor and/or the carrier do not fall off from the photoreactive noxious substance purging material.

Among the above-mentioned microfibrillated microfibers, the bacteria cellulose defibrated products are split most uniformly and are the highest in the holding amount per unit amount of the microfiber. However, cellulose fibers including the bacteria cellulose defibrated products more readily undergo deterioration by the photoreactive semiconductor than aramid fibers, etc., and the shape of the photoreactive noxious substance purging material cannot be continually retained. Therefore, cellulosic microfibrillated microfibers may be used when the period of service of the photoreactive noxious substance purging material is limited, for example, when they are used for filters which are replaced after a certain period irrespective of occurrence of deterioration, but aramid microfibrillated microfibers are suitable when the removing material is used for the longer period or when the higher flame retardancy is required.

As the method for producing the photoreactive noxious substance purging agent using the above-mentioned constructive elements, mention may be made of, for example, a method of first mixing the photoreactive semiconductor with the carrier, then mixing therewith the microfibrillated microfiber, and flocculating and granulating the photoreactive semiconductor-supporting carriers and a method of simultaneously mixing the three elements and accelerating the supporting of the photoreactive semiconductor onto the carriers in addition to mixing of the carriers per se. In both the former and latter methods, the photoreactive noxious substance purging agents are obtained by carrying out the mixing in a dispersion medium mainly composed of water, if necessary, together with known surface active agents and flocculants. Especially, the supporting step in the former method may be carried out by dry-mixing using. Henschel mixer, etc.

The resulting photoreactive noxious substance purging agent may be dried and utilized as a remover of malodor and others. In the case of this photoreactive noxious substance purging agent, particles of the composite can be enlarged without damaging not so much the noxious substance removing ability originally possessed by the photoreactive semiconductor as compared with a mixed powder prepared by merely dry mixing the three components, and the photoreactive semiconductor is not liberated not only in air, but also in water even in the form of granules and the removing agent can be used satisfactorily in any forms.

According to the present invention, the photoreactive noxious substance purging material is produced by enclosing the photoreactive noxious substance purging agent obtained above between two or more sheets, at least one of which has gas permeability (including the embodiment of folding one sheet in two and enclosing the removing agent therebetween). As the sheets between which the removing agent is enclosed, only one side of the sheet or only one of the sheets may have gas permeability or both sides or all of the sheets may have gas permeability. In order to effectively exhibiting the noxious substance removing ability of the photoreactive semiconductor, it is further preferred that at least one of the sheets have light transmission properties.

The gas permeability of the sheet used in the present invention can be measured by the gas permeability test method A specified in JIS L1096. The gas permeability of the sheet is preferably 5–150 cm$^3$/cm$^2$·S, more preferably 10–100 cm$^3$/cm$^2$·S measured by JIS L1096. If the gas permeability is less than 5 cm$^3$/cm$^2$·S, since the gas permeability of the sheet is insufficient, noxious substance cannot sufficiently reach the photoreactive semiconductor enclosed in the sheets and the inherent noxious substance removing ability cannot be exhibited. On the other hand, if the gas permeability is more than 150 cm$^3$/cm$^2$·S, the gas permeability is good, but void diameter of the sheets is great and the photoreactive semiconductor and the carrier between the sheets are likely to fall off although the noxious substance sufficiently flows into the sheets. Therefore, at least one of the sheets enclosing the photoreactive noxious substance purging agent of the present invention has the gas permeability within the above range.

As the sheets which enclose the photoreactive noxious substance purging agent, mention may be made of, for example, woven fabric, nonwoven fabric, net, and sponge, and, furthermore, general-purpose thermoplastic films or thin sheets such as polyethylene film, polypropylene film and polyester film. Among them, the films or thin sheets which are poor in gas permeability may be improved in gas permeability by making fine holes therethrough. As mentioned above, removal of noxious substance with the photoreactive semiconductor requires not only contacting of the photoreactive semiconductor with the noxious substance, but also exposing of the photoreactive semiconductor to active light. Therefore, at least one of the sheets requires to have also light transmission properties. Particularly, when a nonwoven fabric is used as the sheets enclosing the photoreactive noxious substance purging agent of the present invention, not only a gas permeability and light transmission of a certain degree can be secured, but also processing for enclosing the removing agent and processing of the photoreactive noxious substance purging material after formed can be easily performed.

As the fibers used for the nonwoven fabrics advantageously usable as the sheets for enclosing the photoreactive noxious substance purging agent, mention may be made of, for example, the fibers of olefins such as polyethylene and polypropylene, polyesters such as Dacron, polyamides such as polyvinyl acetate, styrenevinyl acetate copolymer and nylon, acrylics such as polyacrylonitrile, Acrilan, Orlon, Dynel and Verel, polyvinyl chloride, polyvinylidene chloride, polystyrene, polyvinyl ether, polyvinyl ketone, polyether, polyvinyl alcohols, dienes, and polyurethanes. Shape of these fibers is not limited, and they may have not only the nearly circular cross-section, but also so-called modified cross-sections such as oval, triangle, star, T-shape, Y-shape and leaf-shape. In addition, they may have voids on the surface or may have a branched structure.

Furthermore, fibers having a sheath-core structure are also preferred in that inter-fiber bond strength and stiffness of nonwoven fabric made therefrom can be suitably controlled. The fibers having sheath-core structure include those which comprise a core portion of polyester and a sheath portion of a polyester copolymer or a core portion of polyester and a sheath portion of polyolefin. The feature of the sheath-core structure resides in that the core portion and the sheath portion differ in softening point. The core portion preferably has a softening point of higher than about 230° C. because the shape of the fibers must be maintained at the time of heat treatment in processing, and the sheath portion preferably has a softening point of about 90°–120° C. because the fibers per se must heat adhere to each other to form a sufficient bond. When such fibers of sheath-core structure are used, strength can be held without conducting a high-temperature heat treatment.

In addition to the constructive elements mentioned above, as the components constituting the sheet of the present invention, mention may be made of natural fibers such as wood pulp, hemp pulp, esparto, and cotton fibers, regenerated fibers and semisynthetic fibers such as rayon fibers and acetate fibers, and inorganic fibers such as glass fibers and alumina fibers. It is preferred to use these fibers in such an amount as not deteriorating the characteristics such as strength and gas permeability possessed by nonwoven fabrics formed of only the aforementioned thermoplastic fibers.

When the photoreactive noxious substance purging materials of the present invention are used for removal of noxious substances in the life space by using them for wall materials, ceiling materials, wall papers, curtains, etc., at least the sheet used for the photoreactive noxious substance purging material is desirably flame retardant. The fibers used for the nonwoven fabric sheet having flame retardancy include aramid fibers whose molecules per se are substantially frame retardant, substantially non-combustible inorganic fibers such as metal fibers, ceramic fibers, rock wool fibers, glass fibers, alumina fibers, zirconia fibers, silicon nitride fibers, silicon carbide fibers, and carbon fibers, and, furthermore, general-purpose fibers containing flame retardants chemically incorporated therein or physically blended therewith. In addition, there may also be used nonwoven fabrics composed of general-purpose fibers and treated with flame retardants. Among them, from the points of processability and cost of materials, preferred are nonwoven fabrics constituted of general-purpose fibers such as polyester, polyolefin, acryl and rayon fibers containing known phosphorus, halogen and inorganic flame retardants chemically incorporated therein or physically blended therewith, and nonwoven fabrics composed of general-purpose fibers and treated with flame retardants.

In order to impart frame retardancy to the photoreactive noxious substance purging materials, not only the sheets which enclose the photoreactive noxious substance purging agent must be flame retardant, but also it is desired that the photoreactive noxious substance purging agent which is enclosed be also flame retardant. As the components of the photoreactive noxious substance purging agent, since the photoreactive semiconductor and the carrier are inorganic material and essentially flame retardant, it is desired that the microfibrillated microfibers be also flame retardant. Therefore, as the microfibrillated microfibers used for the photoreactive noxious substance purging agent enclosed with flame retardant nonwoven fabric, it is necessary to use microfibrillated aramid fibers such as Kevlar which are flame retardant materials or to use the microfibrillated microfibers treated with flame retardants before or after the microfibrillation treatment as mentioned above.

Moreover, active carbon fibers are also suitable as the fibers which constitute the sheets used in the present invention. Active carbon fibers have an adsorption rate of 100–1000 times that of general powdery active carbon and have an adsorption amount of about 10 times per unit amount that of the general powdery active carbon. In addition, since the active carbon fibers are formed by firing starting fibers and are essentially non-combustible, they can also be advantageously used for imparting flame retardancy to the photoreactive noxious substance purging material. Active carbon fibers preferably usable in the present invention have a fiber length of about 0.5–50 mm and a fiber diameter of about 1–100 μm, especially about 10 μm.

The nonwoven fabric used for the photoreactive noxious substance purging materials of the present invention is produced, for example, by a wet method comprising suspending the fibers in water and forming the suspension into a sheet by wet paper making process, so-called dry methods called resin-bonding method by adhesion of the fibers with resins, needle-punching by utilizing entanglement of the fibers with needle, stitch-bonding by knitting yarns, and thermal-bonding by bonding the fibers with heat, jet-bonding by entangling the fibers by jetting a highly pressurized water from a nozzle, spun-bonding by sheeting under direct spinning, and melt-blowing by sheeting with preparing fibrillated microfibers using the spraying principle at the time of direct spinning. By suitably selecting these production methods, not only the physical properties relating to mainly gas permeability such as thickness, void, shape of void and pore diameter of the resulting nonwoven fabric, but also the properties relating to mainly texture such as flexibility, elasticity and hairiness can be changed. Among these production methods, the spun-bonding and jet-bonding are preferred for obtaining a suitable strength.

In order to impart a suitable mechanical strength to the nonwoven fabric used for the photo-reactive noxious substance purging material of the present invention, it is preferred to subject the nonwoven fabric to three-dimensional entangling treatment. The three-dimensional entangling treatment is a method which comprises putting a single nonwoven fabric or a laminate of a plurality of the nonwoven fabrics on a support and subjecting the nonwoven fabric to a mechanical treatment to three-dimensionally entangle the fibers. The method includes specifically needle-punching method and water jet entangling method, and the water jet entangling method is preferred since the entanglement can be performed uniformly and the production speed is high. The water jet entangling method is a method of jetting water onto the nonwoven fabric from above to three-dimensionally entangle the fibers constituting the nonwoven fabric, thereby to develop strength.

As a condition to perform the three-dimensional entanglement strongly and properly, the diameter of a nozzle for jetting water is preferably 10–500 μm. The spacing between the nozzles is preferably 10–1500 μm. The shape of the nozzle is preferably circular and is preferably such that a columnar water can be jetted. The support on which the nonwoven fabric is placed is preferably porous and has a porosity of preferably about 50–200 mesh. The nozzles are required to have a range covering the width of the sheet to be processed in the direction perpendicular to the fabric making direction, and, on the other hand, in the fabric making direction, the number of nozzle heads can be changed within the range where sufficient entanglement can be obtained, taking into consideration the kind of nonwoven fabric, the weight per unit area, the processing speed and the water pressure. The processing speed is preferably in the range of 5–200 m/min. The water pressure is preferably in the range of 10–250 kg/cm$^2$, more preferably in the range of 50–250 kg/cm$^2$.

In addition to these conditions, the surface properties can be improved by successively raising the water pressure from the beginning of the processing to the end of the processing, successively reducing the diameter of the nozzles and the spacing between the nozzles, rotating the nozzle head, vibrating the support from side to side, sprinkling water by inserting a wire between the nozzle and the web, or using a fan-shaped water flow. The three-dimensional entangling can be carried out not only on one side, but also on both sides. Moreover, after performing the entanglement, a nonwoven fabric may be further laminated thereon and subjected to entanglement.

Thickness, etc. of the nonwoven fabric used as the sheets to enclose the photoreactive noxious substance purging agent of the present invention are not limitative, but fiber diameter is preferably in the range of 1–50 μm and basis weight is preferably in the range of 20–100 g/m$^2$. When the fiber diameter is less than 1 μm, voids become small and, thus, the gas permeability is poor, and when it is more than 50 μm, the gas permeability is high, but the voids of the gas permeable sheet are large and the enclosed carrier and/or photoreactive semiconductor are apt to fall off. When the basis weight is smaller than 20 g/m$^2$, the enclosures are apt to fall off and, besides, strength of the nonwoven fabric is insufficient to cause breakage at the time of processing or using. When it is greater than 100 g/m$^2$, the gas permeability decreases or the voids become greater for securing the gas permeability to cause falling off of the enclosures.

The photoreactive noxious substance purging material of the present invention is obtained by enclosing the photoreactive noxious substance purging agent between two or more sheets including nonwoven fabrics, at least one of which has gas permeability. In this case, a thermoplastic resin having heat adhesiveness may be used in the enclosure. When the thermoplastic resin is used, the sheets can be firmly bonded by heat melting the thermoplastic resin, and, furthermore, much more enclosures can be enclosed between the sheets. This is very effective.

The thermoplastic resins used in the present invention are those which melt upon heating to develop the bonding effect between the gas-permeable sheets. As examples of the resins, mention may be made of ethylene-vinyl acetate copolymers or modified products thereof, ethylene-acrylate copolymers, ionomers, polyamides, nylons, polyesters, polyethylenes, polypropylenes, vinyl acetate copolymers, cellulose derivatives such as cellulose triacetate, polymethacrylate esters, polyvinyl ethers, polyurethanes, and polycarbonates. These resins are described in Hiroshi Fukada, "Practice of got Melt Adhesion", published from Kobunshi Kankokai in 1979.

These thermoplastic resins are preferably molten only at the portions of the sheets to be bonded in order to improve adhesion between the sheets. By using them in this way, substantial decrease of the effective surface area of the enclosed photoreactive semiconductor can be inhibited. The thermoplastic resins are preferably used in the case of the total amount of the enclosures such as the photoreactive semiconductor excluding the thermoplastic resin being 20 g/m$^2$ or more, and are used in an amount of preferably 1–30 parts by weight, more preferably 2–20 parts by weight on the basis of 100 parts by weight of the enclusures such as the photoreactive semiconductor excluding the thermoplastic resin.

The photoreactive noxious substance purging agent, if necessary, together with the thermoplastic resin can be enclosed between the sheets by spreading the enclosures all over the sheet and covering them with another sheet, followed by bonding the sheets. Furthermore, at least one of the sheets may be processed to form uneven surface such as corrugated or baggy surface, the enclosures may be filled in the dented portions (protruded downwardly), and another sheet may be placed thereon to bond to each other at the protruded portions. When one of the sheets has the higher gas permeability and another has the higher light transmittance, the noxious substance capturing ability can be secured by using an adsorbent as the carrier, and, therefore, it is preferred to use the sheet of higher light transmittance as the uneven sheet so that the active light can be applied to the larger area of the photoreactive semiconductor.

The method of carrying out the bonding between the sheets includes, for example, bonding with an adhesive, heat melt bonding by hot press, hot embossing roll, etc., and stitching. Two or more of these bonding methods may be used for different portions. Moreover, the heat melt bonded portion or the portion bonded with adhesive may be stitched or the portion stitched with a plastic fiber may be heat melt bonded. That is, the same portion may be bonded by two or more methods.

The interval between the bonded meshes is preferably about 1-50 mm. The meshes may have various shapes such as tetragon, triangle, circle, oval and combination thereof. The gas permeability per unit area can be more highly secured and the noxious substance removing efficiency becomes higher with the narrower width of the bonded portion, but a certain width is necessary considering the processings such as cutting. The width of the bonded portion is preferably about 0.1-50 mm, especially preferably 0.5-5 mm. If necessary, wide bonded portions may be provided at certain intervals. By these methods, the enclosures can be enclosed with securing the gas permeability. Even if the bonded portions at peripheral part are broken, falling off of the enclosure can be restrained to the minimum, and, furthermore, the removing material can be used in an optional size by cutting the bonded portions.

The photoreactive noxious substance purging materials of the present invention can also be obtained by laminating the photoreactive noxious substance purging agents on a support or by mixing a component forming a support with the photoreactive noxious substance purging agent and forming a sheet containing the photoreactive noxious substance purging agent from the mixture in addition to the above-mentioned method of enclosing the photoreactive semiconductor and others between two or more sheets.

In the present invention, for laminating the photoreactive noxious substance purging agents on a support, first the photoreactive semiconductor, the carrier and the microfibrillated microfiber are dispersed together or separately in an aqueous liquid mainly composed of water. When these three components are simultaneously dispersed, the previously mixed three components may be simultaneously dispersed in the aqueous liquid under stirring. More preferably, first the carrier is dispersed and the photoreactive semiconductor is scattered and introduced into the dispersion to adsorb and support the photoreactive semiconductor onto the carrier. Then, to this liquid is added the microfibrillated microfiber to form a composite flocculate. In this case, the microfibrillated microfiber is preferably previously dispersed in the aqueous liquid.

An aqueous dispersion of the composite flocculate can be prepared by mere mixing, but the flocculation state may be adjusted using a suitable flocculant. The flocculants used in the present invention include, for example, basic hydroxides such as zinc hydroxide, aluminum hydroxide, barium hydroxide and magnesium hydroxide, inorganic hydrous oxides such as alumina, silica and zirconia, aluminum sulfate, polyaluminum chloride, anion- or cation-modified polyacrylamides, acrylic acid or methacrylic acid-containing copolymers, alginic acid and polyvinylphosphoric acid, and alkaline salts thereof, and acryloyl-morpholine polymers. These flocculants may be used each alone or in combination of two or more.

The flocculant may be added to the dispersion of the previously mixed three components with stirring. Alternatively, it may be added to the dispersion of the photoreactive semiconductor to previously flocculate the photoreactive semiconductor and, then, other components may be added simultaneously or successively to form flocculates, or it may be added to the dispersion of the carrier to previously flocculate the carrier and, then, other components may be added simultaneously or successively to form flocculates. Since the size of the flocculates affects the degree of at least the photoreactive semiconductor being held in the photoreactive noxious substance purging material and uniformity and processability of the photoreactive noxious substance purging material, amount and method of addition must be optionally determined depending on the flocculants used.

The thus prepared aqueous liquid of the composite flocculate is coated on a support to obtain the photoreactive noxious substance purging material. The shape of the support is unlimited as far as it is in the form of a sheet, and the support includes sheets which are previously melt-molded by extrusion method, inflation method, stretching method, etc. and nonwoven fabrics made by the above-mentioned methods for making nonwoven fabrics. Being different from the sheets used for enclosing method according to the present invention, the sheets used for the coating method may not have gas permeability, but they may naturally have gas permeability or light transmission. The material of these supports is also unlimited, but preferably they are mainly composed of at least thermoplastic resins in view of holding and after-processability of the photoreactive noxious substance purging agent. As the thermoplastic resins, there may be used the materials (fibers) which constitute the nonwoven fabrics used in the enclosing method.

The composite flocculate comprising at least the photoreactive semiconductor, the carrier, the microfibrillated microfiber, and, optionally, the flocculant can be applied to the support, for example, by impregnation of the support with an aqueous liquid of the flocculate by dipping, and by coating the aqueous dispersion on the support by a coater. As the method of impregnation and coating, mention may be made of those which use conventional size press, gate roll size press, film transfer type size press, roll coater, air doctor coater, rod (bar) coater, blade coater, spray coater and curtain coater.

Before application of the composite flocculate by impregnation or coating, the supports are preferably subjected to surface treatments such as glow discharge treatment, flame treatment, plasma treatment, electron ray irradiation treatment, ultraviolet irradiation treatment and ozone treatment. Two or more of these surface treatments may be carried out in combination and, furthermore, different treatments may be applied to one side and another side of the supports. Since the composite flocculate may be applied to only one side of the support, the surface treatment may be conducted on only the side to which the flocculate is to be applied.

The photoreactive noxious substance purging material of the present invention can also be obtained by mixing the composite flocculate with a support-forming component and forming therefrom a sheet containing the photoreactive noxious substance purging agent. The support-forming component is a component necessary to retain the shape of the sheet of the photoreactive noxious substance purging material made from the aqueous dispersion of the composite flocculate. The support-forming component is preferably in the form of fiber, and the material of the fiber is preferably a thermoplastic resin from the points of support-formability and after-processability.

As the thermoplastic resin fiber, there may be used all of the thermoplastic fibers which constitute the nonwoven fabrics used in the enclosing method. In order to improve strength of the photoreactive noxious substance purging materials, there may be further added a small amount of thermosetting synthetic resins such as aniline resin, alkyd resin, epoxy resin, urea resin, phenolic resin, unsaturated polyester resin, furan resin and melamine resin, vegetable fibers such as wood pulp, straw, kenaf, linter, bagasse and esparto, regenerated fibers such as rayon, semisynthetic fibers such as acetate, fluoroplastic fiber, silicone fiber, metal fiber, carbon fiber, ceramic fiber and various glass fibers.

The above aqueous liquid of the composite flocculate is mixed with the support-forming components, and, if necessary, viscosity of the mixture is adjusted with addition of known viscosity modifier (thickening agent). Then, the mixture is made into a sheet by known wet paper making process by a cylinder paper machine, and the sheet is dried to obtain a photoreactive noxious substance purging material. The support-forming component may be added as it is to the aqueous liquid of the composite flocculate, but preferably it is dispersed in an aqueous liquid and the dispersion is mixed with the aqueous liquid of the composite flocculate. A surface active agent may be used in dispersing the support-forming component.

In order to firmly hold the photoreactive semiconductor and others with the support-forming component, there may be further used a small amount of at least a self film-forming binder. Examples of the binders used in the present invention are starch, natural gums, chitosan, alginates, cellulose derivatives such as carboxymethyl cellulose and hydroxyethyl cellulose, polyvinyl acetate, polyvinyl alcohol, poly-N-vinylpyrrolidone, synthetic resin emulsions such as acrylic emulsion, styrenic emulsion, polyvinyl chloride emulsion and polyvinylidene chloride emulsion, and various latexes such as NBR and SBR.

The thus produced photoreactive noxious substance purging material may be put together with a sheet which does not contain at least one of the photoreactive semiconductor, the carrier and the micro-fibrillated microfiber or a photoreactive noxious substance purging material having the same or different composition produced by the same or different method before the drying step, and they may be integrated with retaining entanglement of the fibers to form a sheet having a multilayer structure or a board imparted with a higher strength by further laminating the sheets.

When the photoreactive noxious substance purging material is made into a board, since light or the noxious substance reaches only both the surface portion of the outermost layers, a sheet containing the photoreactive semiconductor is not needed to be laminated as an inner layer, but it serves to improve the strength of the photoreactive noxious substance purging material, and since main uses of the board-like photoreactive noxious substance purging material include structural materials, especially the support-forming component constituting the board-like photoreactive noxious substance purging material is preferably a flame retardant material. The flame retardant material as the support-forming component may be thermoplastic synthetic fiber, natural pulp or the like which is chemically or physically treated with flame retardants mentioned above, but preferred are aramid fibers made of essentially flame retardant materials and non-combustible inorganic fibers such as glass fiber, ceramic fiber, rock wool fiber, carbon fiber, zirconia fiber and alumina fiber.

In order to produce a board-like photoreactive noxious substance purging material, the photoreactive semiconductor, the carrier, the microfibrillated microfiber and inorganic fiber or aramid fiber which is the support-forming component are successively or simultaneously added to water to disperse them in water, or each of them or some of them in groups are separately dispersed in water and the dispersions are mixed. In this case, since inorganic fibers are inferior in strength of entanglement thereof, when inorganic fibers are used as the support-forming component, it is preferred to use an inorganic adhesive.

Examples of the inorganic adhesives used in producing the board are CaO, silica, alumina, phosphates, alkali metal silicates, quenched slag, fly ash, siliceous mixing agents such as diatomaceous earth, and mixtures thereof. Of these inorganic adhesives, suitable is a powder of Kosei clay occurring in Kosei Province of China. The clay is preferably dried at 50°–300° C. and used in the form of a powder of 10–300 mesh. As for the amount of the inorganic adhesive for the inorganic fiber, when it is increased, the maintenance of the fiber is improved, but if it is too large, the characteristics as the board such as flexural strength and tensile strength deteriorate. Therefore, amount of the adhesive is preferably 20–100 parts by weight for 100 parts by weight of the inorganic fiber.

The thus prepared aqueous slurry, if necessary, with addition of a viscosity modifier and a surface active agent, is made into a wet paper by conventional wet paper making process. Two or more of the wet papers depending on the desired thickness of the board are laminated, heated and pressed to integrate them, thereby to obtain the photoreactive noxious substance removing board.

Furthermore, the photoreactive noxious substance purging material of the present invention may be put together with a sheet which does not contain at least one of the photoreactive semiconductor, the carrier and the microfibrillated microfiber or a photoreactive noxious substance purging material having the same or different composition produced by the same or different method after the drying step, and the two or more sheets may be melt bonded with heat or bonded with adhesives to form a composite. Moreover, the photoreactive noxious substance purging material may be put together with a film or sheet which does not contain at least the photoreactive semiconductor and which comprises natural fibers such as wood pulp, thermoplastic resins, thermosetting resins, ceramics, metals or the like to form a composite having multilayer structure. In the case of such structure, not only printing or coloring for giving designs to the sheet can be conveniently carried out, but also textures such as touch can be improved by using a nonwoven fabric comprising rayon.

The photoreactive noxious substance purging agent of the present invention comprises a photoreactive semiconductor, a carrier and a microfibrillated microfiber, and when the photoreactive semiconductor receives an active light, noxious substance can be decomposed by a photocatalytic decomposition action of the photoreactive semiconductor. Furthermore, by combining the photoreactive semiconductor with a carrier, the very fine photoreactive semiconductor is supported on the carrier to form large particles, and, as a result, not only the handleability is improved, but also, when the carrier has an adsorbing ability for noxious substances, noxious substances are adsorbed to the carrier and removed even when the photoreactive noxious substance purging agent is left at the places where no light is applied. When this photoreactive noxious substance purging agent which has adsorbed noxious substances is left at the places where light is applied, the noxious substances adsorbed to the carrier can be decomposed by the photoreactive semiconductor and adsorptivity of the carrier can be regenerated.

Furthermore, in the matrix of the photoreactive noxious substance purging material of the present invention, the microfibrillated microfiber in a small amount has the effect to allow the photoreactive semiconductor and the carrier, the photoreactive semiconductors per se or the carriers per se to adhere to each other without greatly covering the surface of particles by fibrillation. Thus, not only the noxious substance removability can be effectively brought out, but also the powders such as the photoreactive semiconductor and others can be satisfactorily held and the photoreactive noxious substance purging agent can be handled without causing liberation of the photoreactive semiconductor even in water.

By enclosing this photoreactive noxious substance purging agent between sheets at least one of which is gas permeable, not only the photoreactive semiconductor and others can be spread and held in a great area, but also when the sheets are bonded in the desired shape and the bonded portion is cut, processing in optional shapes can be performed, and a photoreactive noxious substance purging material which has an excellent strength and from which the photoreactive noxious substance purging agent does not fall off even when used in water can be obtained. Furthermore, flame retardancy can also be given to the photoreactive noxious substance purging material by using a flame retardant nonwoven fabric as the gas permeable sheet.

Moreover, in the case of enclosing the photoreactive semiconductor, the carrier and the microfibrillated microfiber between two or more sheets at least one of which has gas permeability and, in some cases, additionally flame retardancy, when a thermoplastic resin is used together with the enclosures of photoreactive semiconductor, etc., the thermoplastic resin acts as a binder which improves the adhesion between the sheets and the photoreactive noxious substance purging material having the higher strength can be obtained, and, in addition, the enclosures such as the photoreactive semiconductor, etc. can be enclosed between the sheets in a greater amount.

As for the form of the photoreactive noxious substance purging material, there is the following form in addition to the above-mentioned type of being enclosed between the sheets. That is, when an aqueous liquid of a composite flocculate comprising at least the photoreactive semiconductor, the carrier and the microfibrillated microfiber is applied to a support comprising at least a thermoplastic resin, since the photoreactive semiconductor is supported on at least one of the carrier and the microfiber and fixed on the support, the photoreactive semiconductor is exposed much more on the surface of the removing material, and thus, contact with noxious substances and receiving rate of active light are improved.

Furthermore, when the aqueous liquid of composite flocculate is mixed with the thermoplastic resin fiber substantially constituting the support, and the mixture is made into a sheet by wet paper making process, the photoreactive semiconductor is firmly incorporated together with the carrier and the microfiber into the matrix of the support comprising the thermoplastic resin fiber and, moreover, uniformly dispersed in the surface portion of the sheet and can also uniformly response to light, resulting in less fluctuation in noxious substance removability. Furthermore, in the case of the photoreactive noxious substance purging material made by the composite flocculate coating method which uses the thermoplastic resin in the form of fiber as such or the method of mixing the composite flocculate and making the mixture into sheet, particularly the gas permeability and voids of the sheet are uniform and the material can be satisfactorily utilized as a filter.

DESCRIPTION OF THE PREFERRED EMBODIMENTS

The present invention will be explained in more detail by the following nonlimiting examples.

EXAMPLE 1

Twenty parts by weight of titanium oxide (P25S6 manufactured by Japan Aerosil Co., Ltd., specific surface area: 62 $m^2/g$) as a photoreactive semiconductor and 80 parts by weight of active carbon (KURARAY COAL GW manufactured by Kuraray Chemical Co., Ltd., standard particle size: 20–42 mesh) as a carrier in the form of powder were mixed by Henschel mixer to obtain a mixed powder (a). Separately, 94 parts by weight of water was added to 6 parts by weight of microfibrillated microfiber (CELLISH KY-100S manufactured by Daicel Ltd., fiber diameter: 0.2–0.6 μm and solid content: 25% by weight) and the fiber was dispersed for 2 hours by a homomixer (manufactured by Tokushu Kikakogyo Co., Ltd.) to obtain an aqueous dispersion (a). Under mechanical mixing, 33 parts by weight of the aqueous dispersion (a) was slowly added dropwise to the mixed powder (a) in the manner of spraying to obtain a photoreactive noxious substance purging agent (A) in wet state. This was dried at 150° C. for 30 minutes to obtain a powdery photoreactive noxious substance purging agent (A).

Four parts by weight of the photoreactive noxious substance purging agent (A) in wet state was added to 100 parts by weight of pure water with stirring. After the mixture was left to stand for a certain time, turbidity of the supernatant liquid was measured by a Poick integrating sphere type turbidity meter (SET-PT-501D manufactured by Mitsubishi Chemical Industries, Ltd., cell length: 50 mm) to obtain 570 ppm.

Two grams of the powdery photoreactive noxious substance purging agent (A) was charged in a closable container of 5.6 liters. Two containers containing the photoreactive noxious substance purging agent (A) were prepared, and one of them was provided with a 6 W black lamp so that the container can be irradiated thereby at a distance of about 5 cm. Into the containers was introduced 4 ml (about 500 ppm) of acetaldehyde saturated gas, and concentration of acetaldehyde in the containers was measured at intervals of a given time by a gas chromatography with FID detector. After lapse of 1 hour, 2 hours and 3 hours, saturated gas of acetaldehyde was similarly introduced, and concentrations of acetaldehyde in the containers with time were measured. The results are shown in FIG. 1.

The abscissa axis shows time and the ordinate axis shows relative value of concentration of acetaldehyde. Of the two results in FIG. 1, the solid line indicates the results when irradiation with the black lamp was carried out and the broken line indicates the results when the irradiation was not carried out. Since acetaldehyde was adsorbed to the active carbon as a carrier, the concentration of acetaldehyde decreased irrespective of whether the irradiation with light was carried out or not, but when the irradiation was not carried out, the concentration of acetaldehyde gradually increased with lapse of time while when the irradiation was carried out, increase in the concentration of acetaldehyde with lapse of time was not seen. As a result, it was confirmed that the photoreactive noxious substance purging agent (A) had noxious substance removing ability with light in addition to a strong adsorptivity of the adsorbing material.

EXAMPLE 2

A nonwoven fabric made of polypropylene fibers (basis weight: 40 $g/m^2$, gas permeability: 55 $cm^3/cm^2 \cdot S$) was processed to make uneven. The powdery photoreactive noxious substance purging agent (A) obtained in Example 1 was put on the nonwoven fabric to fill the dented portions with the agent in an amount of 200 g/m². This was covered with another nonwoven fabric of 30 g/m² (gas permeability 80 cm³/cm²·S) and this upper nonwoven fabric was heat melt bonded to the lower nonwoven fabric at the protruded portions of the lower nonwoven fabric to make a photoreactive noxious substance purging material (B). The resulting photoreactive noxious substance purging material (B) was cut along the heat melt bonded portions and rubbed in the palms of the hands to find that no powder fell off from the sheet. Furthermore, this was introduced into water and stirred, but substantially no haze was produced, and liberation of the photoreactive semiconductor was not seen.

This photoreactive noxious substance purging material (B) was cut to 25 cm×13 cm and put on the bottom of a square-shaped closed container of 40 cm×30 cm×30 cm having a 6 W black lamp. In this container was charged acetaldehyde at a concentration of 300 ppm, and the photoreactive noxious substance purging material (B) was irradiated with light at a distance of about 20 cm above the material. Concentration of acetaldehyde after lapse of 20 minutes was determined by the apparatus used in Example 1 to find that the concentration of acetaldehyde decreased to 15 ppm.

EXAMPLE 3

Five parts by weight of a polyethylene fine powder was mixed with 100 parts by weight of the powdery photoreactive noxious substance purging agent (A) obtained in Example 1, and the mixture was allowed to be uniformly present between two nonwoven fabrics comprising polypropylene fibers (basis weight: 20 g/m², gas permeability: 95 cm³/cm²·S). The two sheets were allowed to adhere with heat by a pair of hot rolls having a mesh pattern to make a photoreactive noxious removing material (C). Amount of the enclosed photoreactive noxious substance purging agent (A) was 100 g/m². The resulting photoreactive noxious substance purging material (C) was cut along the heat bonded portions and rubbed in the palms of hands to find that no powder fell off from the sheets. Furthermore, this was introduced into water and stirred to cause substantially no haze, and liberation of the photoreactive semiconductor was not seen.

In the same manner as in Example 2, the acetaldehyde removing ability of the photoreactive noxious substance purging material (C) was measured to find that the concentration decreased from initial 300 ppm to 20 ppm after lapse of 30 minutes and, thus, the removing material (C) had good acetaldehyde removing ability.

COMPARATIVE EXAMPLE 1

Four parts by weight of the mixed powder (a) of titanium oxide and active carbon prepared in Example 1 was added to 100 parts by Weight of pure water with stirring. After the mixture was left to stand for the same time as in Example 1, tubidity of the supernatant liquid was measured by the turbidity meter used in Example 1 to obtain 6000 ppm. Thus, it was found that at least titanium oxide was clearly liberated in water as compared with Example 1 where titanium oxide which was a photoreactive semiconductor was included in the microfibrillated microfibers.

COMPARATIVE EXAMPLE 2

Five parts by weight of polyethylene fine powder was mixed with 100 parts by weight of the mixed powder (a) of titanium oxide and active carbon prepared in Example 1. The mixture was allowed to be uniformly present between two nonwoven fabrics comprising polypropylene fibers used in Example 3, and the two nonwoven fabrics were allowed to adhere with heat by hot rolls having a mesh pattern in the same manner as in Example 3 to obtain a photoreactive noxious substance purging material (D). Amount of the enclosed mixed powder (a) was 100 g/m².

This photoreactive noxious substance purging material (D) was cut to a size of 20 cm×12 cm along the heat adhering portions, and when this was rubbed in the palms of hands, white powder adhered to the palms. When this was introduced in water and stirred, titanium oxide was liberated from the sheets into water, resulting in considerable hazing of water and handleability was inferior.

EXAMPLE 4

Forty parts by weight of polyethylene terephthalate fiber having a fineness of 0.15 denier (d) (fiber diameter: about 4 μm) and a fiber length of 7.5 mm and 60 parts by weight of polyester flame retardant fiber (TREVIRA CS manufactured by Teijin, Limited) having a fineness of 1.5 d (fiber diameter: about 12.4 μm) and a fiber length of 15 mm were introduced into water together with a nonionic surface active agent, followed by vigorously stirring by a pulper until no bundles of fibers were present. After diluted with water, to the product was added a polyacrylamide solution (viscosity modifier) with gentle stirring by an agitator to increase the viscosity, followed by continuing the stirring to obtain a slurry of uniformly dispersed fibers. A nonwoven fabric was obtained from the slurry by a cylinder paper machine.

This nonwoven fabric was placed on a metal net made of stainless steel corresponding to 100 mesh and a water flow was jetted onto the web from above to entangle the fibers. For entanglement of the fibers, five nozzle heads fitted with nozzles were used to carry out the entanglement of the fibers once on each of the front and back sides. Table 1 shows diameter of nozzle (water flow) and intervals of nozzles (water flow) of each head, and pressure. On both sides, the head No. 5 was used for adjustment of the surface with a narrow water flow of low pressure. After completion of the entanglement, the nonwoven fabric was dried by an air-through drier. The basis weight of the resulting flame retardant polyester nonwoven fabric was 60 g/m² and the gas permeability was 60 cm³/cm²·S.

TABLE 1

|  | Head No. | | | | |
| --- | --- | --- | --- | --- | --- |
|  | 1 | 2 | 3 | 4 | 5 |
| Diameter of nozzle (μm) | 120 | 100 | 100 | 100 | 80 |
| Space between nozzle (mm) | 1.2 | 0.6 | 0.6 | 0.6 | 0.8 |
| The number of row | 2 | 1 | 1 | 1 | 2 |
| Pressure (kg/cm²) | 100 | 100 | 100 | 100 | 30 |

Twenty parts by weight of titanium oxide (ST-31 manufactured by Ishihara Sangyo Kaisha Ltd., specific surface area: 220 m²/g) and 80 parts by weight of the active carbon used in Example 1 as a carrier in the form of powder were mixed by a cylindrical mixer for 2 hours to obtain a mixed powder (b). Separately, 98 parts by weight of water was added to 2 parts by weight of microfibrillated micro-Kevlar fiber (CELLISH KY-400S manufactured by Daicel Ltd., fiber diameter: 0.2–0.6 μm) and the fiber was dispersed for 2 hours by a homomixer (manufactured by Tokushu Kikakogyo Co., Ltd.) to obtain an aqueous dispersion (b). Under mechanical mixing, 30 parts by weight of the aqueous dispersion (b) was slowly added dropwise to the mixed powder (b) in the manner of spraying to granulate the fiber, followed by drying at 150° C. for 30 minutes to obtain a powdery photoreactive noxious substance purging agent (B). This was placed on the above flame retardant polyester nonwoven fabric in an amount of 10 g/m², and thereon was put another flame retardant polyester nonwoven fabric, followed by pressing by two embossing rolls heated to 150° C. to obtain a photoreactive noxious substance purging material (E).

EXAMPLE 5

Twenty parts by weight of titanium oxide used in Example 4 and 80 parts by weight of a composite phillosilicate of 20–40 mesh (MIZUKANITE manufactured by Mizusawa Kagaku Kogyo Co., Ltd.) as a carrier in the form of powder were mixed by a cylindrical mixer for 2 hours to obtain a mixed powder (c). In the same manner as in Example 4, a powdery photoreactive noxious substance purging agent (C) was prepared from this mixed powder (c) and the aqueous dispersion (b) prepared in Example 5. This was placed on the flame retardant polyester nonwoven fabric made in Example 4 in an amount of 10 g/m², and thereon was put another flame retardant polyester nonwoven fabric, and a photoreactive noxious substance purging material (F) was obtained in the same manner as in Example 4.

EXAMPLE 6

Fifteen parts by weight of a vinyl acetate resin powder which was a thermoplastic resin and 100 parts by weight of the photoreactive noxious substance purging agent (B) prepared in Example 4 were mixed by a cylindrical mixer for 2 hours to obtain a mixed powder (d). This was placed on the flame retardant polyester nonwoven fabric made in Example 4 in an amount of 50 g/m², and thereon was put another flame retardant polyester nonwoven fabric, and a photoreactive noxious substance purging material (G) was obtained in the same manner as in Example 4.

EXAMPLE 7

Fifteen parts by weight of the thermoplastic resin used in Example 6 and 100 parts by weight of the photoreactive noxious substance purging agent (C) prepared in Example 5 were mixed by a cylindrical mixer for 2 hours to obtain a mixed powder (e). This mixed powder (e) was placed on the flame retardant polyester nonwoven fabric made in Example 4 in an amount of 50 g/m², and thereon was put another flame retardant polyester nonwoven fabric, and a photoreactive noxious substance purging material (H) was obtained in the same manner as in Example 4.

COMPARATIVE EXAMPLE 3

A polyester nonwoven fabric having a basis weight of 60 g/m² was made in the same manner as in Example 4, except that polyester fiber having a fineness of 1.5 d and a fiber length of 15 mm (manufactured by Teijin, Limited) was used in place of the polyester flame retardant fiber used for making the flame retardant polyester nonwoven fabric in Example 4. The resulting nonwoven fabric had a gas permeability of 60 cm³/cm²·S.

On this polyester nonwoven fabric was placed the active carbon used in Example 1 in an amount of 10 g/m², and thereon was put another flame retardant polyester nonwoven fabric, and an active carbon noxious substance removing material was obtained in the same manner as in Example 4.

COMPARATIVE EXAMPLE 4

On the polyester nonwoven fabric made in Comparative Example 3 was placed the mixed powder (c) prepared in Example 5 in an amount of 50 g/m², and thereon was put another polyester nonwoven fabric, and a photoreactive noxious substance purging material (I) was obtained in the same manner as in Example 4.

Deodorization properties, antimicrobial properties, flammability and peeling strength of the photoreactive noxious substance purging materials (E)–(I) and the active carbon noxious substance removing material produced in Examples 4–7 and Comparative Examples 3 and 4 were evaluated by the following test methods. The results are shown in Table 2.

<Test methods>

(1) Deodorization properties:

(A) Deodorization by irradiation with ultra-violet rays:

The photoreactive noxious substance purging material was cut to 10 cm×20 cm and put on the bottom of the closable container provided with a 6 W black lamp which was used in Example 1. In the same manner as in Example 1, 4 ml of acetaldehyde saturated gas was charged in this container, and the photoreactive noxious substance purging material was irradiated with ultraviolet rays by the black lamp. Concentration of acetaldehyde after irradiation for 30 minutes was measured by the gas chromatography used in Example 1. Further, the procedure of charging 4 ml of acetaldehyde saturated gas in the container, irradiating ultraviolet rays and measuring the concentration of acetaldehyde was repeated three times.

(B) Deodorization without irradiation of ultraviolet rays:

The concentration of acetaldehyde was measured in the same manner as in the above method (A), except that the sample was left to stand in the dark without irradiating ultraviolet rays.

(2) Antimicrobial properties:

The photoreactive noxious substance purging material was cut to 10 cm×10 cm and was dipped in an aqueous solution of *Pseudomonas aeruginosa* of 70,000/ml in concentration. The sheet was irradiated with ultraviolet rays by a 6 W black lamp at a distance of about 20 cm from above for 4 hours. After irradiation of 4 hours, the number of surviving cells in the solution was measured by pour plate culturing method using a standard agar medium (culturing at 35° C. for 48 hours) and shown in terms of concentration of *Pseudomonas aeruginosa*. Ratio of the concentration of *Pseudomonas aeruginosa* after irradiation of ultraviolet rays for 4 hours to the initial concentration is shown as reduction rate of concentration of *Pseudomonas aeruginosa* due to the irradiation with ultraviolet rays.

(3) Flammability:

This was tested in accordance with the method A-1 of JIS L1091.

(4) Peeling strength:

The photoreactive noxious substance purging material was cut to 2 cm×15 cm, and one end thereof was notched to form two sheets. The end parts of these sheets were peeled from each other by 7 cm and the end of each of the peeled sheets was fixed by a chuck and the peeling strength was measured by a tensilon universal testing machine (manufactured by Orienteck Co., Ltd.) at a distance (span) between the chucks of 10 cm. An average of 10 maximum peeling strengths is shown as interlayer peeling strength.

TABLE 2

|  | Examples | | | | Comparative Examples | |
| --- | --- | --- | --- | --- | --- | --- |
|  | 4 | 5 | 6 | 7 | 3 | 4 |
| Concentration of acetaldehyde (ppm) | | | | | | |
| Irradiated with ultraviolet ray | | | | | | |
| The 1st charging | 80 | 100 | 15 | 20 | 85 | 20 |
| The 2nd charging | 80 | 105 | 18 | 20 | 100 | 25 |
| The 3rd charging | 85 | 110 | 15 | 25 | 105 | 25 |
| The 4th charging | 80 | 105 | 15 | 20 | 110 | 20 |
| Not irradiated with ultraviolet ray | | | | | | |
| The 1st charging | 85 | 105 | 18 | 120 | 85 | 110 |
| The 2nd charging | 95 | 170 | 25 | 140 | 100 | 135 |
| The 3rd charging | 100 | 190 | 30 | 160 | 105 | 150 |
| The 4th charging | 110 | 230 | 40 | 170 | 110 | 165 |
| Reduction rate of concentration of pseudomonas aeruginosa by irradiation with ultraviolet ray | 1/80 | 1/50 | 1/200 | 1/100 | 1/1 | 1/100 |
| Flammability | | | | | Ignited and burnt | Ignited and burnt |
| Heating for 1 minute | | | | | | |
| Char area (cm$^2$) | 25 | 25 | 28 | 28 | | |
| Afterflame (sec) | 2 | 2 | 3 | 3 | | |
| Afterglow (sec) | 5 | 5 | 5 | 5 | | |
| Length of char (cm) | 18 | 18 | 20 | 20 | | |
| After 30 seconds from ignition | | | | | | |
| Char area (cm$^2$) | 28 | 28 | 30 | 30 | | |
| Afterflame (sec) | 2 | 2 | 3 | 3 | | |
| Afterglow (sec) | 5 | 5 | 5 | 5 | | |
| Length of char (cm) | 19 | 19 | 20 | 20 | | |
| Criterion of flammability | 3 | 3 | 3 | 3 | | |
| Interlayer peeling strength[1] (g) | 280 | 290 | 525 | 520 | 280 | 280 |

Note
[1]The interlayer peeling strengths in Examples 1–4 and Comparative Example 1 are in practically acceptable range. The interlayer peeling strength in Comparative Example 2 was practically unacceptable.

It can be seen from Table 2 that the photoreactive noxious substance purging material (E) enclosing at least the photoreactive semiconductor (the present invention) decomposed the greater amount of acetaldehyde by irradiation with light. On the other hand, in the case of the active carbon noxious substance removing material containing no photoreactive semiconductor (not the present invention), amount of acetaldehyde decreased than the total charging amount of acetaldehyde due to the noxious substance adsoptivity of the active carbon, but there was no difference in the removing effect with and without the irradiation. Furthermore, the active carbon noxious substance removing material was inferior to the photoreactive noxious substance purging material (E) of the same total amount of the enclosure in both the acetaldehyde removing ability and the reduction rate of concentration of Pseudomonas aeruginosa by irradiation with light. Furthermore, the active carbon noxious substance removing material ignited in the flammability test because the nonwoven fabrics enclosing the enclosure had no frame retardancy.

The photoreactive noxious substance purging material (I) containing the photoreactive semiconductor as one of the components of the enclosure (not the sample of the present invention) was not inferior to other photoreactive noxious substance purging materials (E)–(H) in both the acetaldehyde removing ability and the reduction rate of concentration of Pseudomonas aeruginosa by irradiation with light, but it ignited in the flammability test because the nonwoven fabrics enclosing the enclosure had no frame retardancy like the active carbon noxious substance removing material. Furthermore, it was low in interlayer peeling strength probably because the thermoplastic resin was not used in the enclosure although the amount of the enclosure was large, and when it was rubbed in the palms of hands, the enclosure fell off.

As compared with these active carbon noxious substance removing material and the photoreactive noxious substance purging material (I), the photoreactive noxious substance purging material (E)–(H) of the present invention were not only superior in the deodorization and antimicrobial properties with irradiation of light, but also were practically acceptable in both the flammability and the peeling strength.

EXAMPLE 8

Ten parts by weight of the photoreactive semiconductor used in Example 1, 10 parts by weight of active carbon (manufactured by Wako Junyaku Kogyo Co., Ltd., average particle diameter: 5 μm) as a carrier and 2 parts by weight (solid content) of the microfibrillated microfiber used in Example 1 were introduced into water and mechanically mixed by a mixer, followed by adding 0.02 part by weight of aluminum sulfate as a flocculant to form an aqueous liquid (a) of a composite flocculate containing the photoreactive semiconductor.

Separately, a small amount of a dispersant (PRIMAL 850 manufactured by Japan Acryl Chemical Co., Ltd.) was added to 38 parts by weight of a thermoplastic resin fiber having a fineness of 0.5 d and a fiber length of 5 mm (polyester fiber manufactured by Teijin, Limited) and 40 parts by weight of a thermoplastic resin fiber having a sheath-core structure and a fineness of 2 d and a fiber length of 5 mm (MELTY #4080 manufactured by Unitika, Ltd.) to prepare a thermoplastic resin fiber dispersion (a). The aqueous liquid (a) of composite flocculate and the thermoplastic resin fiber dispersion (a) were mixed with stirring and an anion-modified polyacrylamide was further added to stabilize the liquid system, and, thereafter, a photoreactive noxious substance purging material (J) having a basis weight of 100 g/m$^2$ was prepared from the mixture by a cylinder paper machine and dried at 100° C.

The photoreactive noxious substance purging material (J) was cut to 12 cm×20 cm and put in the two containers used in Example 1, one of which was constructed so that it could be irradiated with a 6 W black lamp at a distance of about 5 cm. Saturated gas of acetaldehyde was charged in the containers, and concentration of acetaldehyde in the containers was measured at intervals of a given time by the gas chromatography used in Example 1. Similarly, saturated gas of acetaldehyde was charged again after lapse of 1 hour and 2 hours, and concentrations of acetaldehyde in the containers with lapse of time were measured. The results are shown in FIG. 2.

Figure 2:
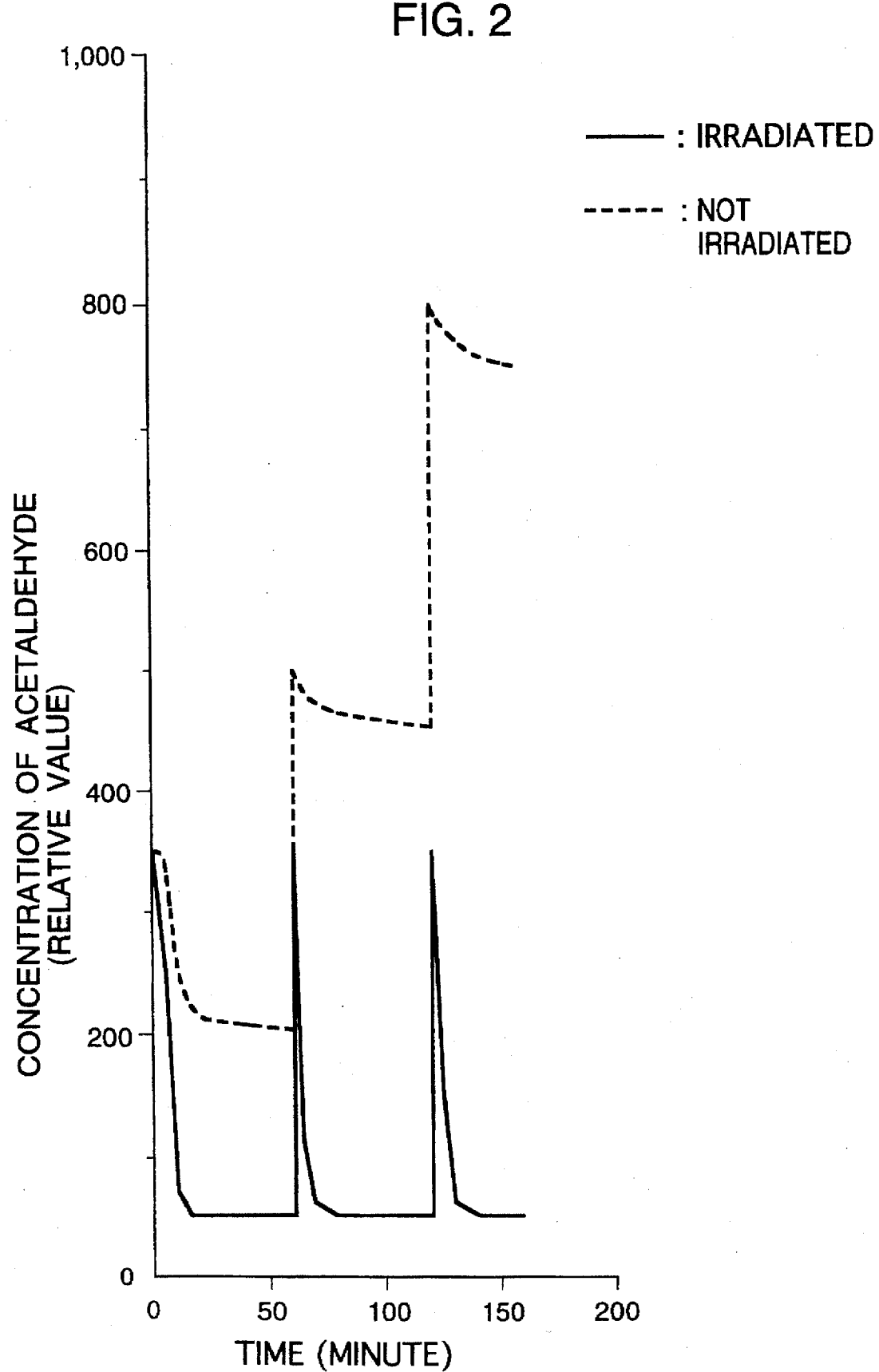
FIG. 2 is a graph which shows decrease in the concentration of acetaldehyde when the photoreactive noxious substance purging material (J) of Example 8 of the present invention was used.

Since acetaldehyde was adsorbed to active carbon, concentration of acetaldehyde decreased irrespective of irradiation with light or not, but as is clear from FIG. 2, when light was not irradiated, the concentration gradually increased by the repeated charging of acetaldehyde while in the case of the container irradiated with light, the concentration of acetaldehyde did not increase due to the effect of the photoreactive semiconductor even by charging again acetaldehyde. Thus, it was confirmed that the photoreactive noxious substance purging material (J) had the noxious substance removing ability with light in addition to the adsorptivity of the active carbon.

Furthermore, when the photoreactive noxious substance purging material (J) was irradiated with light by a 10 W black lamp for 10 days, no falling off of powder was seen in the container. Moreover, when the surface of the removing material (J) was rubbed by fingers, no white powder adhered to the fingers and good state could be maintained.

EXAMPLE 9

Ten parts by weight of the photoreactive semiconductor used in Example 1, 10 parts by weight of a composite phillosilicate pigment (MIZUKANITE AP manufactured by Mizusawa Kagaku Kogyo Co., Ltd., average particle diameter: 2 μm) as a carrier and 2 parts by weight of a microfibrillated microfiber (CELLISH KY-400 manufactured by Daicel, Limited) were introduced into water and mechanically dispersed, followed by adding polyaluminum chloride (PAC manufactured by Mizusawa Kagaku Kogyo Co., Ltd.) as a flocculant to obtain an aqueous liquid (b) of composite flocculate. This was mixed with the thermoplastic resin fiber dispersion (a) prepared in Example 8 with stirring, and an anion-modified polyacrylamide was further added to stabilize the liquid system, and, thereafter, a photoreactive noxious substance purging material (K) having a basis weight of 100 g/m$^2$ was prepared from the mixture by a cylinder paper machine and dried at 100° C.

Using the photoreactive noxious substance purging material (K), change in the concentration of acetaldehyde was measured. When the material was not irradiated with light, acetaldehyde did not substantially decrease probably because the carrier did not adsorb acetaldehyde while when it was irradiated with light, the concentration decreased to 1/10 in about 40 minutes. It was confirmed from these results that the photoreactive noxious substance purging material (K) also had the noxious substance removing ability with light. Furthermore, when the photoreactive noxious substance purging material (K) was irradiated with light by a 10 W black lamp for 10 days, no falling off of powder was seen in the container, and, furthermore, when the surface of the removing material (K) was rubbed by fingers, no white powder adhered to the fingers and good state could be maintained.

COMPARATIVE EXAMPLE 5

An aqueous liquid (c) of composite flocculate was prepared in the same manner as in Example 8, except that titanium oxide as the photoreactive semiconductor was not used and the microfibrillated microfiber and active carbon were mixed at a ratio of 1:5. Using the resulting aqueous liquid (c) of composite flocculate and the thermoplastic resin fiber dispersion (a) prepared in Example 8, a noxious substance removing material (L) of the same mixing ratio and the same basis weight as of the removing material (J) was made in the same manner as in Example 8. The acetaldehyde removing ability of this noxious substance removing material (L) was measured in the same manner as in Example 8. Since acetaldehyde was adsorbed to the active carbon, the concentration of acetaldehyde decreased, but as in Comparative Example 3, with repeatedly charging acetaldehyde, the concentration of acetaldehyde in the container increased and there was substantially no difference in increment depending on whether irradiation of light was carried out or not. It was confirmed that the noxious substance removing material (L) did not have at least the noxious substance removing ability with light.

COMPARATIVE EXAMPLE 6

Without using carrier, the microfibrillated microfiber used in Example 1 and titanium oxide used in Example 4 as the photoreactive semiconductor at a ratio of 1:5 were introduced into water and mechanically mixed by a mixer, and thereto was further added 0.1 part by weight of sodium aluminate to obtain an aqueous liquid (d) of composite flocculate.

The aqueous liquid (d) of composite flocculate and the thermoplastic resin fiber dispersion (a) prepared in Example 8 were mixed with stirring at the same mixing ratio as in Example 1, and a photoreactive noxious substance purging material (M) of the same basis weight as in Example 8 was prepared in the same manner as in Example 8. The acetaldehyde removing ability of the photoreactive noxious substance purging material (M) was measured by the same method as in Example 8 to find that the concentration of acetaldehyde decreased in the container irradiated with light, and the removing material (M) had noxious substance removing ability with light.

However, when the photoreactive noxious substance purging material (M) was irradiated with light by a 10 W black lamp for 10 days, though no falling off of powder was seen in the container, but when the surface of the removing material (M) was rubbed by fingers, white powder adhered to the fingers, and it was confirmed that the removing material (M) deteriorated with light.

EXAMPLE 10

An aqueous liquid (e) of composite flocculate was prepared using the same materials and the same method as in Example 8, except that the titanium oxide was replaced with the same amount of ultrafine zinc oxide particles (F60 manufactured by Mitsubishi Material Co., Ltd., specific surface area: 60 m²/g) as photoreactive semiconductor. The resulting aqueous liquid (e) of composite flocculate was mixed with the thermoplastic resin fiber dispersion (a) prepared in Example 8 at the same solid content ratio as in Example 8 with stirring, and an anion-modified polyacrylamide was further added to stabilize the liquid system, and, thereafter, a photoreactive noxious substance purging material (N) having a basis weight of 100 g/m² was prepared in the same manner as in Example 8 and dried at 100° C.

Change in the concentration of acetaldehyde was measured with the photoreactive noxious substance purging material (N) in the same manner as in Example 8. It was confirmed that the removing material (N) was inferior in the noxious substance removing ability with light to the removing material (J), but had a sufficient noxious substance removing ability with light. Furthermore, when the photoreactive noxious substance purging material (N) was irradiated with light by a 10 W black lamp for 10 days, no falling off of powder was seen in the container, and, besides, when the surface of the removing material (N) was rubbed by fingers, no powder adhered to the fingers, and good state could be maintained as in Example 8.

EXAMPLE 11

Ten parts by weight (interms of solid matter) of metatitanic acid (manufactured by Tochem Products Co., Ltd.) as a photoreactive semiconductor was dispersed in water, and the dispersion was neutralized with an aqueous sodium hydroxide solution. To this dispersion were added 10 parts by weight of magnesium carbonate and 2 parts by weight of the microfibrillated microfiber used in Example 1, and an aqueous liquid (f) of composite flocculate was prepared in the same manner as in Example 8.

Separately, 23 parts by weight of a thermoplastic resin fiber having a fineness of 0.5 d and a fiber length of 5 mm (polyester fiber manufactured by Teijin, Limited), 30 parts by weight of a thermoplastic resin fiber having a fineness of 2 d and a fiber length of 5 mm (polyester fiber manufactured by Teijin, Limited) and 25 parts by weight of a thermoplastic resin fiber having a sheath-core structure and a fineness of 2 d and a fiber length of 5 mm (MELTY #4080 manufactured by Unitika, Ltd.) were introduced into water, and thereto was added a small amount of a dispersant to prepare a thermoplastic resin fiber dispersion (b). Using the aqueous liquid (f) of composite flocculate and the thermoplastic resin fiber dispersion (b), a photoreactive noxious substance purging material (O) was prepared at the same ratio and basis weight as in Example 8 and in the same manner as in Example 8 and dried at 130° C.

Change in the concentration of acetaldehyde was measured with the photoreactive noxious substance purging material (O) in the same manner as in Example 8. It was confirmed that the removing material (O) also had the noxious substance removing ability with light because concentration of acetaldehyde greatly decreased only when light was irradiated. Furthermore, when the removing material (O) was irradiated with light by a 10 W black lamp for 10 days, no falling off of powder was seen in the container, and, besides, when the surface of the removing material (N) was rubbed by fingers, no white powder adhered to the fingers, and good state could be maintained.

EXAMPLE 12

An anion-modified polyacrylamide was added to the thermoplastic resin fiber dispersion (b) prepared in Example 11 and comprising the three thermoplastic resin fibers and the dispersant, and after stabilization of the liquid system, a thermoplastic resin fiber sheet having a basis weight of 78 g/m² was made by a cylinder paper machine.

Separately, an aqueous liquid (g) of composite flocculate was prepared in the same manner as in Example 8 using 10 parts by weight of titanium oxide used in Example 1, 10 parts by weight of magnesium carbonate used in Example 11 as a carrier and 2 parts by weight of the microfibrillated microfiber used in Example 1. This aqueous liquid (g) was coated on one side of the above thermoplastic resin fiber sheet at a solid coating amount of 11 g/m² and dried to obtain a photoreactive noxious substance purging material (P).

Change in the concentration of acetaldehyde was measured with the photoreactive noxious substance purging material (P) by irradiating the coated side of the removing material (P) in the same manner as in Example 8. It was confirmed that the removing material (P) also had the noxious substance removing ability with light because concentration of acetaldehyde greatly decreased only when light was irradiated. Furthermore, when the removing material (P) was irradiated with light by a 10 W black lamp for 10 days, no falling off of powder was seen in the container, and, besides, when the surface of the removing material (P) was rubbed by fingers, no white powder adhered to the fingers, and good state could be maintained.

EXAMPLE 13

An aqueous dispersion of a photoreactive semiconductor, a composite phillosilicate, Kosei clay and a microfibrillated microfiber, and an aqueous dispersion of a ceramic fiber and a glass fiber were prepared using 8 parts by weight of the photoreactive semiconductor used in Example 4, 8 parts by weight of the carrier used in Example 5, 5 parts by weight of the microfibrillated microfiber used in Example 1, 42 parts by weight of a ceramic fiber (SC FIBER 1400 manufactured by Shin-nittetsu Chemical Co., Ltd.), 8 parts by weight of a glass fiber and 29 parts by weight of Kosei clay as an inorganic adhesive. Then, the resulting two aqueous dispersions were mixed, and a wet paper was made therefrom by wet paper making process using a cylinder paper machine. Twenty wet papers thus obtained were laminated, and the laminate was put between nets of 100 mesh and heated and pressed at 140° C. and 40 kgf/cm² for 60 minutes to integrate them to obtain a board-like photoreactive noxious substance purging material (Q) of 1.5 mm thick.

EXAMPLE 14

Ten parts by weight of the photoreactive semiconductor used in Example 1, 10 parts by weight of the carrier used in Example 5, 20 parts by weight of a microfibrillated aramid microfiber (NORMEX ARAMID FIBRID manufactured by DuPont Japan Co., Ltd.), 3 parts by weight of a microfibrillated cellulosic microfiber (CELLISH KY-100S manufactured by Daicel, Ltd.) and 47 parts by weight of an aramid fiber (CORNEX 6 manufactured by Teijin Limited) were stirred in water to disperse them, and a wet paper was made from the dispersion by wet paper making process using a cylinder paper machine in the same manner as in Example 13. Twenty-two wet papers thus obtained were laminated, and the laminate was put between nets of 100 mesh and heated and pressed at 140° C. and 40 kgf/cm² for 60 minutes to integrate them to obtain a board-like photoreactive noxious substance purging material (R) of 0.5 mm thick.

COMPARATIVE EXAMPLE 7

An aqueous dispersion of a composite phillosilicate, Kosei clay and a microfibrillated microfiber, and an aqueous dispersion of a ceramic fiber and a glass fiber were prepared in the same manner as in Example 13, except that the photoreactive semiconductor was not used. A wet paper was made therefrom by wet paper making process using a cylinder paper machine. Twenty wet papers thus obtained were laminated, and a board (S) of 1.5 mm thick was made in the same manner as in Example 13.

COMPARATIVE EXAMPLE 8

A board (T) of 0.5 mm thick was made in the same manner as in Example 14, except that the photoreactive semiconductor was not used and the active carbon used in Example 1 was used in place of the composite phillosilicate.

The board-like photoreactive noxious substance purging materials (Q) and (R) produced in Examples 13 and 14 and the boards (S) and (T) produced in Comparative Examples 7 and 8 were evaluated on flammability (JIS L1091, Method A-2 <45° Meckel Burner method>), tensile strength (JIS P8113), and flexural strength (JIS K7203), and deodorization properties and antimicrobial properties by the following test methods. The results are shown in Table 3.

(1) Deodorization properties:

The board was cut to 6 cm×20 cm and placed on the bottom of a 5.6 liter closed container having a 6 W black lamp. In this container was charged 0.4 ml (about 50 ppm) of acetaldehyde saturated gas, and the board was irradiated with ultraviolet rays by the black lamp provided at a distance of about 20 cm above the board. Concentration of acetaldehyde after 60 minutes was measured in the same manner as in Example 1.

(2) Antimicrobial properties:

The board was cut to 5 cm×5 cm and 1 ml of Methicillin resistant *Staphylococcus aureus* 11D 1677 solution was dropped on the board to obtain a test piece. The same amount of the cell solution dropped on the test piece was stored in a laboratory dish and this was used as a control sample. The cell solution was prepared in the following manner. A culture solution of the test cells obtained by carrying out shaking culture on a broth medium (manufactured by Eiken Kagaku Co., Ltd.) at 35° C. for 18 hours was diluted to 20,000 times with a sterilized phosphoric acid buffer solution.

The test piece and the control sample were placed at a distance of 15 cm under a light source of 15 W fluorescent lamp and stored at 25° C. The number of surviving cells after stored for 6 hours and 24 hours was measured.

The test piece and the control sample were washed with 10 ml of SCDLP medium (manufactured by Nippon Seiyaku Co., Ltd.) and the number of surviving cells in the washing liquid was measured by pour plate method (culturing at 35° C. for 48 hours) using the standard agar medium (manufactured by Eiken Kagaku Co., Ltd.), and it was shown in terms of the number per the test piece and the control sample.

TABLE 3

|  | Examples | | Comparative Examples | |
| --- | --- | --- | --- | --- |
|  | 13 | 14 | 7 | 8 |
| Concentration of acetaldehyde (ppm) | 5 | 5 | 25 | 10 |
| The number of surviving cells of methicillin resistant staphylococcus aureus[1] | | | | |
| At the beginning of test | $4 \times 10^5$ | | | |
| After 6 hours under fluorescent lamp | $2 \times 10^1$ | | | |
| After 24 hours under fluorescent lamp | N.D.[2] | | | |
| Flammability | | | | |
| Heating for 2 minutes | | | | |
| Char area (cm$^2$) | 0 | 10 | 0 | 10 |
| Afterfleame (sec) | 0 | 2 | 0 | 2 |
| Afterglow (sec) | 1 | 2 | 1 | 2 |
| Length of char (cm) | 0 | 8 | 0 | 8 |
| Ignitability | Not ignited | | Not ignited | |
| After 6 seconds from ignition |  | 15 |  | 15 |
| Char area (cm$^2$) |  | 2 |  | 2 |
| Afterflame (sec) |  | 2 |  | 2 |
| Afterglow (sec) |  | 10 |  | 10 |
| Length of char (cm) |  | 3 |  | 3 |
| Criterion of flammability | 3 | 3 | 3 | 3 |
| Tensile strength  Lengthwise (Kg/15 mm) |  | 19.9 |  | 20.1 |
| Crosswise |  | 15.8 |  | 15.6 |
| Flexural strength  Lengthwise (Kg/cm$^2$) | 78.3 |  | 76.2 |  |
| Crosswise | 58.9 |  | 59.7 |  |

Notes
[1] The number of surviving cells for the control sample: $4 \times 10^5$ at the beginning of test, $4.4 \times 10^5$ after 6 hours under fluorescent lamp, and $2.2 \times 10^3$ after 24 hours under fluorescent lamp.
[2] This means that no cells were detected by this method of measuring the cell number.

As can be seen from Table 3, the photoreactive noxious substance purging materials (Q) and (R) of the present invention can decompose the noxious substances such as malodorous substances and microorganisms with light and remove them, and, besides, they have practically usable various conditions as non-combustible, flame retardant and strong structural materials. Therefore, the board-like photoreactive noxious substance purging materials are suitable not only for wall materials, but also for various indoor and outdoor structural materials.

As explained above, according to the present invention, a photoreactive noxious substance purging agent having excellent noxious substance removing ability with light and a photoreactive noxious substance purging material using the removing agent. The photoreactive noxious substance purging agent which comprises a photoreactive semiconductor, a carrier and a microfibrillated microfiber can be prevented from falling off of the photoreactive semiconductor even if it is particulate without greatly reducing the effective surface area of the semiconductor by the carrier and the microfiber, and the removing agent is excellent in continual noxious substance removing ability with light not only in rooms, but also in water.

When this photoreactive noxious substance purging agent is enclosed in two or more sheets, at least one of which has gas permeability, not only the photoreactive noxious substance purging agent can be spread and held in a great area, but also it can be processed into optional shapes, and a photoreactive noxious substance purging material which has an excellent strength and from which the photoreactive noxious substance purging agent does not fall off even when used in water can be obtained.

Furthermore, when a flame retardant nonwoven fabric is used as the gas permeable sheet in the photoreactive noxious substance purging material comprising at least a photoreactive semiconductor and a carrier enclosed between two or more gas permeable sheets, the removing material can be made wholly flame retardant since the photoreactive semiconductor and the carrier are inherently non-combustible and, besides, flexibility and hand of the removing material can be adjusted.

Moreover, when a thermoplastic resin fiber is used together with the enclosures in the case of enclosing the enclosures between the sheets, the thermoplastic resin fiber acts as a binder to improve the adhesion between the sheets, and the enclosures can be enclosed in the greater amount and the strength can be further improved.

As for the form of the photoreactive noxious substance purging material containing the photoreactive noxious substance purging agent which comprises a photoreactive semiconductor, a carrier and a microfibrillated microfiber, the removing material may be not only the type of the photoreactive noxious substance purging agent being enclosed between the sheets, but also a type of the photoreactive noxious substance purging agent being coated and a type of the photoreactive noxious substance purging agent being made into a sheet. These sheets can be utilized as filters not only in air, but also in water, and, furthermore, have excellent processability.

These photoreactive noxious substance purging materials of various shapes and having various holding amounts of the photoreactive semiconductor can be selected, and can be cut to a suitable size and can easily remove noxious substances by decomposing them with mere irradiation of light. Therefore, they can be efficiently utilized for removing not only noxious substances contained in low concentrations in air such as malodor, but also noxious substances contained in low concentrations in water.

The photoreactive noxious substance removing materilas of the present invention can be utilized as deodorizing sheets in automobiles, trains, etc. In this case, no special light irradiating devices are needed at the places exposed to sunlight. As method of using them at such places, they can be used as interior materials such as front board materials, wall materials and fitted to deodorizers, etc. in the folded form. Furthermore, they can be provided in the folded form at household articles such as shoe boxes, hangers, refrigerators, lockers, and cabinets. Moreover, they can be utilized as wall papers, floor materials and curtains in toilet, kitchen, bath room, and dressing room, and, in addition, containers for pet toilet. Furthermore, they can be used around fluorescent lamps because fluorescent lamps contain wavelengths of active light for photoreactive semiconductors.

In hospitals, they can be used as materials of sheets and curtains, and as wall materials and floor materials of passages and treatment rooms. Further, they can be utilized as filters of household air conditioners, office air conditioners, cleaners, driers for wet refuses. These may be provided with exclusive light source devices, but since intermittent irradiation of light regenerates the deodorizing properties, they can be effectively used in the facilities which the sunlight strikes in the daytime.

In water, they can be used as filters for improving quality of water in water supply and drainage, for purification of rivers and lakes, for final treatment of factory wastes, and for purification of water in bath and swimming pool. When they are used as floating materials on water, they are more effective since the sunlight can also be used as a light source.

What is claimed is:

1. A photoreactive noxious substance purging agent comprising a photoreactive semiconductor, a carrier, and a microfibrillated microfiber, wherein the weight ratio of the photoreactive semiconductor to the carrier is about 1:30 to 10:1.

2. A photoreactive noxious substance purging material comprising the photoreactive noxious substance purging agent of claim 1 enclosed between two or more sheets, at least one of which has gas permeability.

3. A photoreactive noxious substance purging material according to claim 2, wherein one or both of the sheets enclosing the photoreactive noxious substance purging agent is a flame retardant nonwoven fabric.

4. A photoreactive noxious substance purging material according to claim 2, wherein a thermoplastic resin is additionally enclosed between the sheets.

5. A photoreactive noxious substance purging material according to claim 2, wherein the microfibrillated microfiber is a fiber partially or wholly fibrillated into 1 μm or less.

6. A photoreactive noxious substance purging material according to claim 2, wherein the photoreactive semiconductor is a titanium oxide having a specific surface area of 50 m$^2$/g or more.

7. A photoreactive noxious substance purging material according to claim 2, wherein the material comprises 1–50 g/m$^2$ of the photoreactive semiconductor.

8. A photoreactive noxious substance purging material according to claim 2, wherein the gas permeability of at least one of the sheets is 5 to 150 cm$^3$/cm$^2$·S.

9. A photoreactive noxious substance purging agent according to claim 1, wherein the photoreactive semiconductor is selected from the group consisting of zinc oxide, tungsten oxide, titanium oxide, and cerium oxide.

10. A photoreactive noxious substance purging agent according to claim 1, wherein the photoreactive semiconductor has a surface area of about 10 to 500 m$^2$/g and a particle size of about 3–120 nm.

11. A photoreactive noxious substance purging agent according to claim 1, wherein the carrier is selected from the group consisting of silica, alumina, zirconia, activated clay, zeolite, sepiolite, halloysite, hydroapatite, zinc oxide, silica-alumina composites, silica-zinc oxide composites, silica-magnesia composites, zinc oxide-magnesia composites, silica-alumina-zinc oxide composites, silica, alumina-magnesia composites, and active carbons.

12. A photoreactive noxious substance purging agent according to claim 1, wherein the carrier has a specific surface area of about 50 to 2000 m$^2$/g and a particle size of 100 nm to 10 μm.

13. A photoreactive noxious substance purging agent according to claim 1, wherein the microfibrillated microfiber is selected from the group consisting of cellulose fibers, aramid fibers, acrylic fibers, polyethylene fibers, polypropylene fibers, acrylonitrile fiber, bacteria and polyester fibers.

14. A photoreactive noxious substance purging agent according to claim 1, wherein the microfibrillated microfiber has a diameter of 1 μm or less.

15. A photoreactive noxious substance purging agent according to claim 1, wherein the microfibrillated microfiber is present in an amount of about 0.2 to 50% by weight, based on the total weight of the photoreactive semiconductor and carrier.

16. A method of removing noxious substances from air or water, comprising bringing the photoreactive noxious substance purging agent of claim 1 into contact with air or water containing a noxious substance and exposing the photoreactive semiconductor to light.

17. A photoreactive noxious substance purging material made by coating an aqueous liquid of a composite flocculate containing at least a photoreactive semiconductor, a carrier, and a microfibrillated micro-fiber on a support comprising at least a thermoplastic resin, wherein the weight ratio of the photoreactive semiconductor to the carrier in the material is about 1:30 to 10:1.

18. A photoreactive noxious substance purging material made by mixing an aqueous liquid of a composite flocculate containing at least a photoreactive semiconductor, a carrier, and a microfibrillated micro-fiber, with a thermoplastic resin fiber dispersion and making the mixture into a sheet by a wet paper making process, wherein the weight ratio of the photoreactive semiconductor to the carrier in the material is about 1:30 to 10:1.

19. A photoreactive noxious substance purging material made by mixing an aqueous Liquid of a composite flocculate containing at least a photoreactive semiconductor, a carrier, and a microfibrillated micro-fiber, with an aqueous dispersion containing at least one of an inorganic fiber and an aramid fiber, making the mixture into a wet paper by a wet paper making process, laminating at least two of the wet papers, and heating and pressing the laminate to integrate them, wherein the material the weight ratio of the photoreactive semiconductor to the carrier is about 1:30 to 10:1.

* * * * *